United States Patent
Yamada et al.

(10) Patent No.: US 9,661,182 B2
(45) Date of Patent: May 23, 2017

(54) IMAGE PROCESSING DEVICE AND IMAGE PROCESSING APPARATUS

(71) Applicant: CANON KABUSHIKI KAISHA, Tokyo (JP)

(72) Inventors: Akitoshi Yamada, Yokohama (JP); Mitsuhiro Ono, Tokyo (JP); Fumitaka Goto, Tokyo (JP); Rie Kajihara, Minoo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/260,157

(22) Filed: Sep. 8, 2016

(65) Prior Publication Data

US 2016/0381247 A1 Dec. 29, 2016

Related U.S. Application Data

(63) Continuation of application No. 14/602,135, filed on Jan. 21, 2015, now Pat. No. 9,466,017, which is a continuation of application No. 12/818,133, filed on Jun. 17, 2010, now Pat. No. 8,976,411.

(30) Foreign Application Priority Data

Jul. 1, 2009 (JP) .................... 2009-157314

(51) Int. Cl.
*G06K 15/02* (2006.01)
*H04N 1/407* (2006.01)

(52) U.S. Cl.
CPC ... *H04N 1/4072* (2013.01); *H04N 2201/0094* (2013.01)

(58) Field of Classification Search
USPC ................ 358/1.1–3.29, 519, 520, 533, 463
See application file for complete search history.

(56) References Cited

U.S. PATENT DOCUMENTS

| | | |
|---|---|---|
| 5,991,056 A | 11/1999 | Takamori |
| 6,122,076 A | 9/2000 | Shiota |
| 6,567,096 B1 | 5/2003 | Oka et al. |
| 6,577,751 B2 | 6/2003 | Yamamoto |
| 6,788,434 B1 | 9/2004 | Kanematsu et al. |
| 6,985,246 B2 | 1/2006 | Utsunomiya |

(Continued)

FOREIGN PATENT DOCUMENTS

| | | |
|---|---|---|
| JP | 9-18704 A | 1/1997 |
| JP | 11-66271 A | 3/1999 |

(Continued)

*Primary Examiner* — Marcellus Augustin
(74) *Attorney, Agent, or Firm* — Fitzpatrick, Cella, Harper & Scinto

(57) ABSTRACT

An image processing device includes a first and a second image processing module including an image processing unit, and a connection module that is connected to the first and second image processing modules, and moves an image data from one image processing module to the other image processing module. At least one of the image processing modules includes a weighted average processing unit that calculates, based on a weighting coefficient included in an attribute value, a weighted average of a pixel value of the input image data and a image processed pixel value, and an output unit which outputs at least one of the image processed pixel value and the weighted-averaged pixel value.

28 Claims, 15 Drawing Sheets

(56) References Cited

U.S. PATENT DOCUMENTS

| | | |
|---|---|---|
| 7,266,254 B2 | 9/2007 | Ishikawa et al. |
| 7,274,478 B2 | 9/2007 | Oshima et al. |
| 7,277,198 B2 | 10/2007 | Kawanabe et al. |
| 7,430,054 B2 | 9/2008 | Masumoto et al. |
| 7,440,612 B2 | 10/2008 | Ogata et al. |
| 7,565,011 B2 | 7/2009 | Matsunaga et al. |
| 7,653,217 B2 | 1/2010 | Ikegawa |
| 7,800,784 B2 | 9/2010 | Kawanabe et al. |
| 2001/0048771 A1 | 12/2001 | Sasaki |
| 2002/0001097 A1* | 1/2002 | Matsui .................. G06K 15/02 358/1.9 |
| 2002/0122198 A1 | 9/2002 | Tsue et al. |
| 2003/0228067 A1 | 12/2003 | Miyake et al. |
| 2004/0021710 A1 | 2/2004 | Hayasaki |
| 2004/0175054 A1 | 9/2004 | Ogata et al. |
| 2004/0196408 A1 | 10/2004 | Ishikawa et al. |
| 2004/0223185 A1 | 11/2004 | Yamada et al. |
| 2005/0036160 A1 | 2/2005 | Goto et al. |
| 2005/0128528 A1 | 6/2005 | Yamada et al. |
| 2005/0262311 A1 | 11/2005 | Lippinicott |
| 2006/0132874 A1* | 6/2006 | Ishikawa .................. G06T 1/20 358/518 |
| 2006/0173904 A1 | 8/2006 | Nakajima |
| 2006/0245002 A1 | 11/2006 | Kita |
| 2006/0245008 A1 | 11/2006 | Kohashi |
| 2006/0279801 A1 | 12/2006 | Nagai |
| 2007/0201095 A1 | 8/2007 | Kawanabe et al. |
| 2008/0049238 A1 | 2/2008 | Nagarajan et al. |
| 2008/0247677 A1 | 10/2008 | Yoshino |
| 2008/0309961 A1 | 12/2008 | Aichi et al. |
| 2009/0153592 A1 | 6/2009 | Choi et al. |
| 2010/0110222 A1 | 5/2010 | Smith et al. |
| 2010/0156974 A1 | 6/2010 | Kasahara |

FOREIGN PATENT DOCUMENTS

| | | |
|---|---|---|
| JP | 11-355591 A | 12/1999 |
| JP | 2000-90237 A | 3/2000 |
| JP | 2000-156872 A | 6/2000 |
| JP | 2001-338288 A | 12/2001 |
| JP | 2002-8002 A | 1/2002 |
| JP | 2002-77623 A | 3/2002 |
| JP | 2002-94809 A | 3/2002 |
| JP | 2004-15322 A | 1/2004 |
| JP | 2004-120092 A | 4/2004 |
| JP | 2004-159148 A | 6/2004 |
| JP | 2004-222069 A | 8/2004 |
| JP | 2005-173926 A | 6/2005 |
| JP | 2005-323103 A | 11/2005 |
| JP | 2006-121607 A | 5/2006 |
| JP | 2006-140601 A | 6/2006 |
| JP | 2006-178546 A | 7/2006 |
| JP | 2006-309524 A | 11/2006 |
| JP | 2006-341446 A | 12/2006 |
| JP | 2007-124233 A | 5/2007 |
| JP | 2007-538334 A | 12/2007 |

* cited by examiner

IMAGE PROCESSING DEVICE AND IMAGE PROCESSING APPARATUS

This application is a continuation of U.S. application Ser. No. 14/602,135, filed Jan. 21, 2015, now U.S. Pat. No. 9,466,017, issued Oct. 11, 2016, which is a continuation of U.S. application Ser. No. 12/818,133, filed Jun. 17, 2010, now U.S. Pat. No. 8,976,411, issued Mar. 10, 2015, the contents of which are incorporated herein by reference.

BACKGROUND OF THE INVENTION

Field of the Invention

The present invention relates to an image processing device and an image processing apparatus.

Description of the Related Art

A printing apparatus, which prints information such as characters and images on a printing medium, is known. As a printing system, an ink-jet printing system, which performs printing using inks, is available. In recent years, a multifunction printer, which adopts such ink-jet printing system (to be referred to as an ink-jet multifunction printer hereinafter), has prevailed. As a feature of the ink-jet multifunction printer, a copy process on plain paper and a direct print process on photo paper can be achieved by a single printer.

As a printing speed is increasing, it is required to speed up image processes. The image processes are implemented by hardware or software. The hardware scale and cost essentially have a proportional relationship. In order to reduce a product price while enhancing functions, so as to gain greater customer satisfaction, the processing performance has to be improved while suppressing hardware cost. Hence, a hardware technique, which flexibly changes processes according to specifications and intended purposes, has been proposed (see Japanese Patent Laid-Open No. 2006-178546).

In general, in a copy process, for example, a character modification process is executed. The character modification process is executed to suppress an adverse effect on a halftone dot part due to emphasized edges of a character part. For this reason, in this process, a character area and halftone dot area have to be determined, and image processes suited to the respective areas have to be executed (see Japanese Patent Laid-Open No. 2002-77623).

Upon printing a photo image (so-called photo printing), for example, a dodging process is executed. In dodging, in order to suppress an adverse effect on a background part while maintaining an appropriate lightness level of an object in a backlight state, an object area and remaining area have to be determined, and processes suited to the respective areas have to be executed (see Japanese Patent Laid-Open No. 9-18704). Likewise, even in a red-eye correction process for removing a red eye at the time of flash imaging and a noise reduction process for removing dark part noise at the time of photo imaging, a uniform process is not applied to the entire image. That is, a correction process has to be applied to a specific adverse effect occurrence area while suppressing an adverse effect on a part having good image quality (see Japanese Patent Laid-Open Nos. 11-355591 and 2004-15322). Furthermore, in addition to the aforementioned related arts, for example, a process for adaptively calculating a weighted average of a plurality of image processing results is known (see Japanese Patent Laid-Open No. 2000-156872).

When the aforementioned image processes (that is, those according to areas) are to be speeded up in the copy process or photo printing process, dedicated circuits for those processes are normally arranged. For this reason, an apparatus, which includes both a copy function and photo printing function like an ink-jet multifunction printer, has to incorporate both the circuits, and cannot avoid an increase in cost.

In the aforementioned weighted average process as well, a dedicated circuit that calculates the weighted average has to be arranged. In this case, in addition to the plurality of dedicated circuits required to execute different image processes, the dedicated circuit that executes the weighted average process is required.

SUMMARY OF THE INVENTION

The present invention provides a technique that allows the weighted average process to be executed using processing image data including pixel values and attribute values associated with the pixel values without arranging any dedicated circuit.

According to a first aspect of the present invention, there is provided an image processing device, which processes image data that expresses an image, and is edited to image data including, in correspondence with each pixel of the image, a pixel value field that holds a pixel value of the pixel and an attribute value field that holds an attribute value, the device comprising: a first image processing module comprising an image processing unit; a second image processing module comprising an image processing unit; and a connection module which is connected to the first image processing module and the second image processing module, and moves the image data from one image processing module to the other image processing module, wherein at least one of the first image processing module and the second image processing module comprises: a weighted average processing unit configured to calculate, based on information associated with a weighting coefficient included in the attribute value, a weighted average of a pixel value of the image data input via the connection module and a pixel value obtained by processing the pixel value by the image processing unit; and an output unit configured to output at least one of the pixel value processed by the image processing unit and the pixel value weighted-averaged by the weighted average processing unit.

According to a second aspect of the present invention, there is provided an image processing apparatus comprising: an above image processing device; a memory configured to hold the image data processed by the image processing device; and a control unit configured to control the image processing device.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that the following description will exemplify an image processing apparatus which adopts an ink-jet printing system. However, the present invention is not limited to such specific system. For example, an electrophotography system using toners as color materials may be adopted.

The image processing apparatus may be, for example, a single-function printer having only a printing function, or a multifunction printer having a plurality of functions including a printing function, FAX function, and scanner function. Also, the image processing apparatus may be, for example, a manufacturing apparatus to manufacture a color filter, electronic device, optical device, micro-structure, and the like using a predetermined printing system.

In this specification, "printing" means not only forming significant information such as characters or graphics but also forming, for example, an image, design, pattern, or structure on a printing medium in a broad sense regardless of whether the formed information is significant, or processing the medium as well. In addition, the formed information need not always be visualized so as to be visually recognized by humans.

Also, a "printing medium" means not only a paper sheet for use in a general printing apparatus but also a member which can fix ink, such as cloth, plastic film, metallic plate, glass, ceramics, resin, lumber, or leather in a broad sense.

Also, "ink" should be interpreted in a broad sense as in the definition of "printing" mentioned above, and means a liquid which can be used to form, for example, an image, design, or pattern, process a printing medium, or perform ink processing upon being supplied onto the printing medium. The ink processing includes, for example, solidification or insolubilization of a coloring material in ink supplied onto a printing medium.

Figure 1:
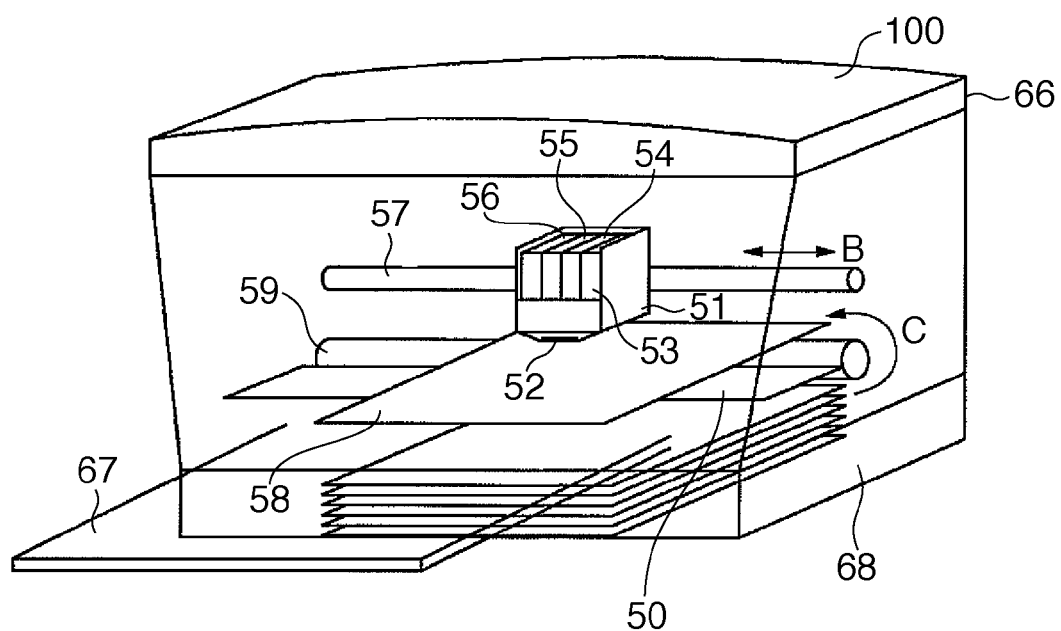
FIG. 1 is a schematic perspective view showing the arrangement of an image processing apparatus 100.

FIG. 1 is a schematic perspective view showing the arrangement of an image processing apparatus 100 according to an embodiment of the present invention.

The image processing apparatus 100 includes, for example, a printing unit, scanning unit, and control unit (not shown). The printing unit incorporates, for example, an ink-jet serial printer, and the scanning unit incorporates, for example, a CCD flatbed scanner.

The scanning unit scans an image formed on a printing medium by optically scanning the printing medium. The scanning unit is normally arranged on an upper portion of the printing unit. The scanning unit includes an upper cover 66 used to press an original. The upper cover 66 is pivotal about hinges (not shown). On the other hand, the printing unit includes a paper discharge unit 67 used to discharge a printed printing medium outside the apparatus, and a paper feed unit 68 which stacks printing media such as printing sheets used in printing.

As shown in FIG. 1, the printing unit includes, for example, a head carriage 51, printhead 52, ink tanks 53 to 56, shaft 57, conveyance roller 59, platen 50, head carriage motor (not shown), and conveyance motor (not shown).

The head carriage 51 mounts, for example, the printhead 52, the ink tank 53 which stores black ink, the ink tank 54 which stores cyan ink, the ink tank 55 which stores magenta ink, and the ink tank 56 which stores yellow ink. The head carriage 51 moves along the shaft 57 in the directions of arrows B.

The printhead 52 adopts, for example, an ink-jet system which discharges ink using a heat energy. The printhead 52 includes printing elements configured by heat generation elements (to be referred to as heaters hereinafter), and heater driving circuits. The heaters are arranged in correspondence with respective nozzles. In the ink-jet printing system using the heat generation elements, a voltage is applied to each heat generation element to heat ink in the vicinity of that heat generation element to instantaneous boiling. Then, an ink droplet is discharged by an abrupt bubble pressure generated by a phase change of the ink at the time of boiling. Note that the ink discharge system is not limited to such specific system. For example, any other systems such as a system using piezo elements, that using electrostatic elements, and that using MEMS elements may be used.

In a printing operation, the image processing apparatus 100 brings in an uppermost printing sheet 58 in the paper feed unit 68 in a U-shape (arrow C) using the conveyance roller 59 and a driving motor. When the leading end of the printing sheet 58 reaches a position below the printhead 52, the head carriage 51 reciprocally moves in the directions of the arrows B, and the printhead 52 discharges ink droplets onto the printing sheet 58. In this way, printing for one scan is done. The image processing apparatus 100 conveys the printing sheet 58 by a length corresponding to one scan using the conveyance roller 59, and controls the head carriage 51 to scan again, thus performing printing. Since this operation is repetitively executed, printing is attained. Upon completion of printing for the printing medium, the image processing apparatus 100 discharges the printing sheet 58 onto the paper discharge unit 67. In this manner, the printing operation ends.

Figure 2:
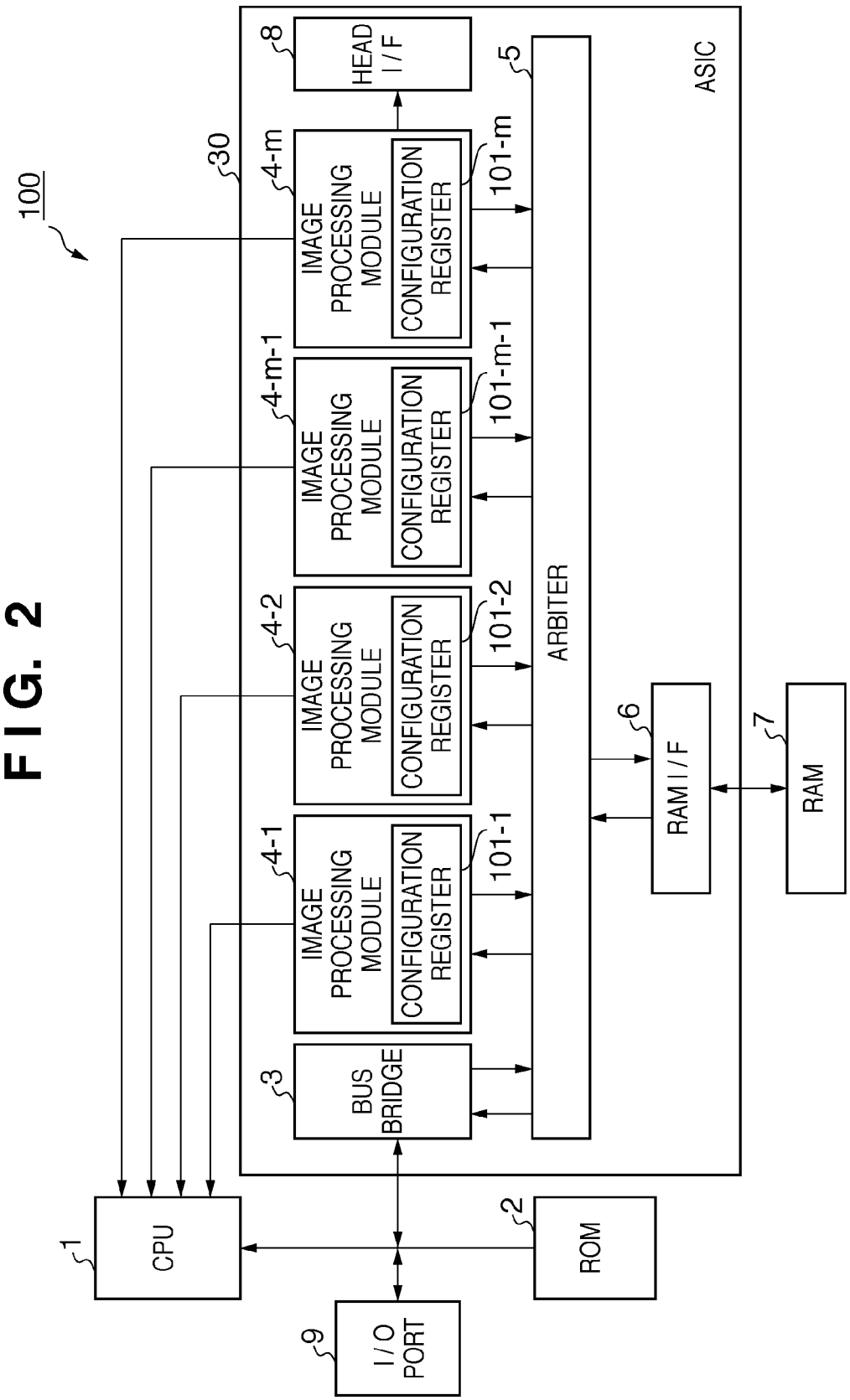
FIG. 2 is a block diagram showing an example of a control unit (not shown) of the image processing apparatus 100 shown in FIG. 1.

FIG. 2 is a block diagram showing an example of the control unit (not shown) of the image processing apparatus 100 shown in FIG. 1.

A CPU 1 systematically controls processes in the image processing apparatus 100. A ROM 2 stores programs and the like. A RAM 7 is used as, for example, an image rendering area and a work area required to execute programs. An ASIC (Application Specific Integrated Circuit) 30 generates, for example, a control signal required to control the printhead 52. The ASIC 30 includes m image processing modules 4-1 to 4-$m$ (m is an integer equal to or larger than 1), which execute various image processes (these image processing modules will often be collectively referred to as an image processing module 4 hereinafter). As will be described in detail later, the image processing modules respectively include m configuration registers 101-1 to 101-$m$ (m is an integer equal to or larger than 1) (these configuration registers will often be collectively referred to as a configuration register 101 hereinafter).

An arbiter 5 arbitrates access to the RAM 7. A RAM interface 6 is an interface with the RAM 7. A head interface (output interface) 8 is an interface with the printhead 52. Note that this embodiment will exemplify a case in which the RAM 7 is shared by the CPU 1 and the image processing modules 4-1 to 4-$m$. Alternatively, a RAM exclusively used by the CPU 1 may be independently arranged.

The operation of the image processing apparatus 100 upon reception of an image to be processed will be described below. When the image processing apparatus 100 receives an image at an I/O port 9, it stores the received image in the RAM 7 via a bus bridge (input interface) 3, the arbiter 5, and the RAM interface 6. This process is executed according to, for example, a program which is stored in the ROM 2 and is executed by the CPU 1.

Upon completion of storage of the image, the image processing apparatus 100 controls the CPU 1 to set parameters in the configuration register (to be simply referred to as a register hereinafter) 101-1 of the image processing module 4-1. The image processing module 4-1 starts its operation according to the set parameters. Note that the register 101 holds parameters required to control the operation of the image processing module. The register 101 holds, for example, an address range in the RAM 7 where the data is stored, and an address range in the RAM 7 as a storage destination of data after processing.

After the parameters are set in the register 101-1, the image processing module 4-1 reads out data from the RAM 7 or writes data in the RAM 7 according to the set parameters (address ranges in this case). The image processing module 4-1 executes its process according to the parameters. Upon completion of the process, the image processing module 4-1 generates an interrupt, and notifies the CPU 1 of completion of the process.

Upon reception of the interrupt notification, the CPU 1 analyzes that interrupt factor. In case of a notification sent upon completion of the read process, the CPU 1 sets a read address range of next data in the register 101-1 to continue the process of the image processing module 4-1. In case of a notification sent upon completion of the write process, the CPU 1 sets an address range as a storage destination of data after processing in the register 101-1 to continue the process of the image processing module 4-1. At this time, the CPU 1 sets parameters in the register 101-2 of the image processing module 4-2 to control the image processing module 4-2 to start its operation.

Upon setting the parameters, the image processing module 4-2 starts its process as in the image processing module 4-1. Then, upon completion of the read or write process described above, the image processing module 4-2 generates an interrupt, and notifies the CPU 1 of completion of the process. After that, the same process as that described above is executed and, for example, the image processing module 4-3 starts its operation. In this way, in the image processing apparatus 100, when the process in the certain image processing module 4 ends, the next image processing module 4 is activated to pass processed data in turn to the image processing modules 4. In this manner, a pipeline including the image processing module 4 as a unit is implemented.

During a period from when one image processing module 4 starts execution of an image process instructed by the CPU 1 until that image processing module 4 ends the image process to be ready to output the processed data, another image processing module 4 can parallelly execute a process. More specifically, data can be input from the RAM 7 to another image processing module 4, and data, the process of which ends in the other image processing module, can be output to the RAM 7. Furthermore, since each image processing module 4 executes an image process independently of other image processing modules 4, a plurality of image processing modules 4 can be parallelly operated to simultaneously progress a plurality of image processes.

After the process advances to the image processing module 4-$m$-1, as described above, and bitmap data having a predetermined size or more is generated, the CPU 1 activates the printing unit. The image processing module 4-$m$ sends the bitmap data to the printing unit in synchronism with a sync signal of the printing unit. Then, an image is printed on a printing medium.

Figure 3:
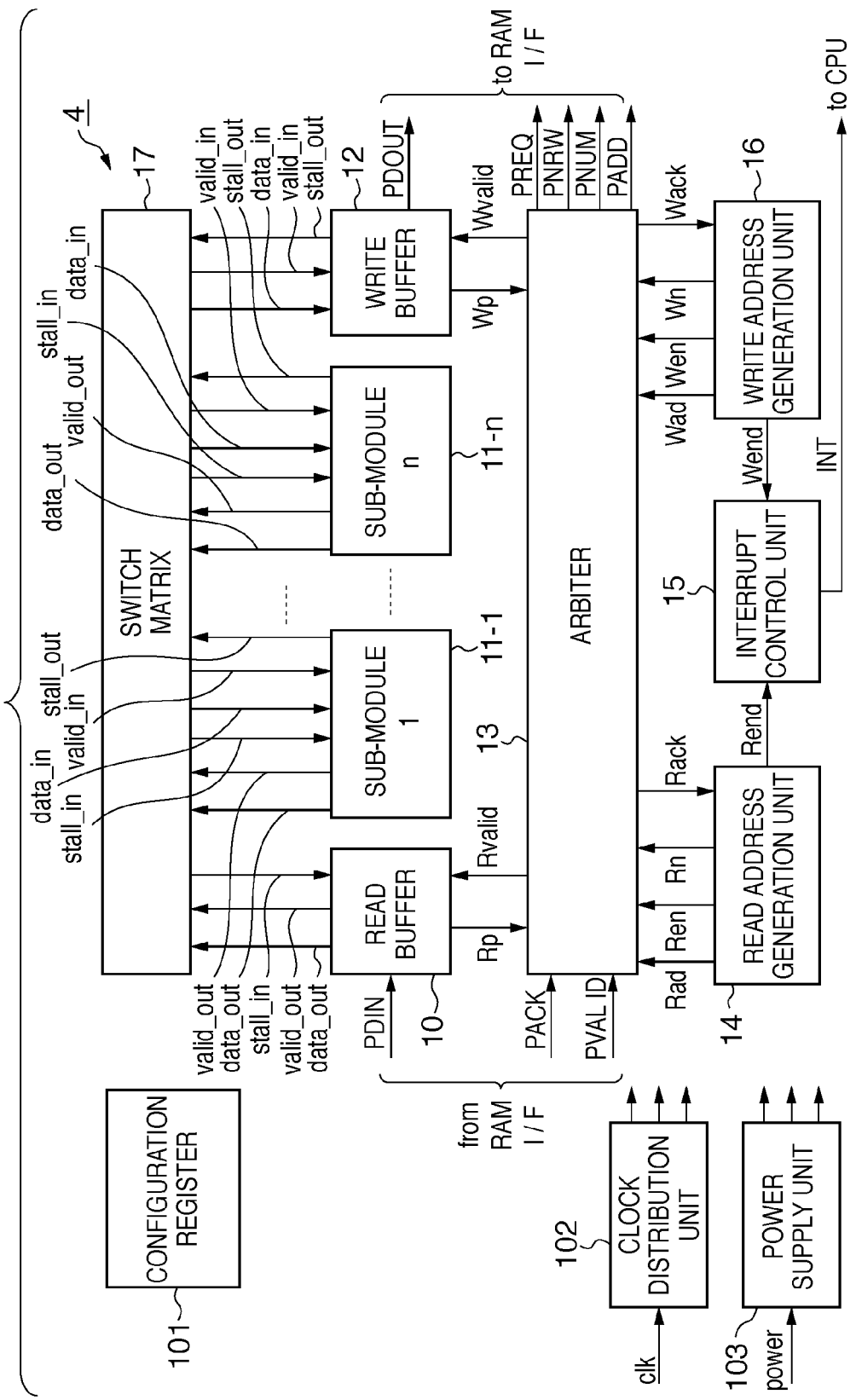
FIG. 3 is a block diagram showing an example of the arrangement of an image processing module 4 shown in FIG. 2.

FIG. 3 is a block diagram showing an example of the internal arrangement of the image processing module 4 shown in FIG. 2.

The image processing module 4 includes a read buffer 10, sub-modules 11-1 to 11-$n$ (these sub-modules will often be collectively referred to as a sub-module 11 hereinafter), write buffer 12, arbiter 13, and read address generation unit 14. Furthermore, the image processing module 4 includes an interrupt control unit 15, write address generation unit 16, switch (switch matrix) 17, register 101, clock distribution unit 102, and power supply unit 103.

In the register (configuration register) 101, parameters associated with operations of the switch matrix 17, read address generation unit 14, write address generation unit 16, and the like are set. The clock distribution unit 102 distributes clock pulses clk of the apparatus to respective units in the image processing module 4. The clock distribution unit 102 can stop supply of clocks clk to an arbitrary sub-module 11 according to the settings in the register 101. The power supply unit 103 controls supply of electric powers to respective units in the image processing module 4. The power supply unit 103 can stop supply of an electric power to an arbitrary sub-module according to the settings in the register 101. The switch matrix 17 sequentially inputs data to a plurality of sub-modules 11 in a predetermined order. Then, a series of image processes to be applied to data to be processed are executed using the plurality of sub-modules 11.

The switch matrix 17 is a connection module/connection unit, which connects the read buffer 10, sub-modules 11, and write buffer 12 via data lines and control lines. For example, a line data_out of the read buffer 10 is connected to a line data_in of each sub-module 11. Likewise, a line valid_out of the read buffer 10 is connected to a line valid_in of each sub-module 11, and a line stall_out is connected to a line stall_in. These connections are attained based on the settings in the configuration register 101. The order that the switch matrix 17 inputs processing image data to the plurality of sub-modules 11 is decided in advance. This order can be fixedly decided like, for example, the read buffer 10, sub-module 1, sub-module 2, . . . , sub-module n, and write buffer 12. In this way, since the switch matrix 17 can fulfill its role by always moving the processing image data among the sub-modules in the predetermined order, the arrangement of the switch matrix 17 can be simplified. Also, depending on the parameters set in the configuration register 101 by the CPU 1, the connection state of the switch matrix 17 can be changed. Therefore, connections among the respective sub-modules and the data transfer order can be dynamically changed according to the processing contents to be executed by the image processing module 4. Therefore, by replacing the order of contents of processes to be given to the respective sub-modules, one image processing module 4 can implement various image processes. Note that the switch matrix 17 includes a known cross-bar switch or selector group. As another mode of the switch matrix 17, that of a Ring Bus may be adopted.

A case will be examined below wherein one image processing module 4 includes different types of sub-modules 11. Assume that sub-modules 1 (11-1) to n−1 (11-n-1) are those having an (adaptive) image processing unit 413 shown in FIG. 5 to be described later, and a sub-module n (11-n) is that having a (static) image processing unit 413 shown in FIGS. 6 to be described later. In this case, the order that the (static) image processing unit 413 processes processing image data may be fixed, thus posing a disadvantage. However, such disadvantage can be eliminated by using a plurality of image processing modules 4 in combination. For example, in the first image processing module 4, the (adaptive) image processing unit 413 and (static) image processing unit 413 execute a former half image process including a process using the (static) image processing unit 413. Then, processing image data that has undergone the process using the (static) image processing unit 413 is transferred to the second image processing module 4. In the second image processing module 4 which received that processing image data, the (adaptive) image processing module 413 executes a latter half image process. In the second image processing module 4, after the (adaptive) image processing unit 413 executes the latter half image process, the data is directly transferred to the write buffer 12 without using the (static) image processing unit 413.

On the other hand, even when one image processing module 4 includes different types of sub-modules, it can be designed to change the order of processes among the sub-modules. This can be realized when the CPU 1 sets order information that instructs the order of processes among the sub-modules in the register 101, and the switch matrix 17 controls the input order of processing image data with reference to the order information. In this case, the arrangement of the switch matrix 17 is complicated compared to a case in which the order of processes among the sub-modules is fixed. However, in this case, since the plurality of image processing modules 4 can respectively execute different image processes, the image processes can be speeded up compared to a case in which one image process is executed using the plurality of image processing modules 4.

As described above, the CPU 1 sets parameters in the register 101 of the image processing module 4. When the CPU 1 sets a read start address and read end address as parameters, the read address generation unit 14 outputs a read enable signal Ren. At this time, the read address generation unit 14 outputs a read address Rad and a read access unit Rn from the RAM 7 with reference to the parameters set in the register 101. If Rn assumes a fixed value, the read address generation unit 14 may output Rn without referring to any parameters in the register 101. When the CPU 1 sets a write start address and write end address, the write address generation unit 16 outputs a write enable signal Wen. At this time, the write address generation unit 16 outputs a write address Wad and a write access unit Wn to the RAM 7 with reference to the parameters set in the register 101. If Wn assumes a fixed value, the write address generation unit 16 may output Wn without referring to any parameters in the register 101.

The arbiter 13 detects a free capacity Rp of the read buffer 10 and the read enable signal Ren from the read address generation unit 14. As a result of detection, assume that a read address is valid (Ren=1), and the read buffer 10 has a free area (Rp≥Rn (Rn: the read access unit from the RAM 7)). In this case, the arbiter 13 issues a read request (PREQ=1, PNRW=0, PNUM=Rn, PADD=Rad) to the arbiter 5.

On the other hand, if a data storage amount Wp of the write buffer 12 is equal to or larger than a predetermined size (Wp Wn (Wn: the write access unit to the RAM 7), the arbiter 13 detects the write enable signal Wen of the write address generation unit 16. Then, the arbiter 13 issues a write request to the arbiter 5. That is, if a write address is valid (Wen=1), and the write buffer 12 is ready to output data (Wp Wn), the arbiter 13 issues a write request (PREQ=1, PNRW=1, PNUM=Wnum, PADD=Wad) to the arbiter 5.

Upon reception of a request signal PREQ from the image processing module 4, the arbiter 5 determines based on a signal PNRW whether a read or write request is received (0: read, 1: write). The arbiter 5 detects a transfer size (the number of transfer words) based on a signal PNUM, and detects an address based on a signal PADD. If other requests (those from the CPU 1 and other image processing modules 4) are not received, the arbiter 5 begins to access that data in the RAM 7, and returns an acknowledge signal PACK to the image processing module 4 as a request source. On the other hand, if other requests are received, the arbiter 5 arbitrates processes corresponding to the requests, and controls to execute the processes in turn in accordance with a priority order.

Upon reception of the acknowledge signal PACK from the arbiter 5, the arbiter 13 determines whether that signal is that corresponding to the read or write request. In case of the read request, the arbiter 13 returns an acknowledge signal Rack to the read address generation unit 14 as a request source. Upon reception of the acknowledge signal Rack, the read address generation unit 14 generates an address in the RAM 7 as a data read source and outputs it as the address Rad. When the requested address (that generated by the read address generation unit 14) is the read end address set in the register 101, the read address generation unit 14 resets the read enable signal Ren. Also, the read address generation unit 14 outputs a read end signal Rend toward the interrupt control unit 15.

On the other hand, if the acknowledge signal PACK from the arbiter 5 is that corresponding to the write request, the arbiter 13 returns an acknowledge signal Wack to the write address generation unit 16 as a request source. Upon reception of the acknowledge signal Wack, the write address generation unit 16 generates an address in the RAM 7 as a data write destination. When the requested address is the write end address set in the register 101, the write address generation unit 16 resets the write enable signal Wen, and outputs a write end signal Wend toward the interrupt control unit 15.

The interrupt control unit 15 sets a read end interrupt mask and write end interrupt mask based on the parameters set in the register 101. If the setting of each interrupt mask is enabled, the interrupt control unit 15 generates an interrupt signal INT in response to the read end signal Rend or write end signal Wend, and notifies the CPU 1 of the generated signal.

Upon reception of the interrupt signal INT, the CPU 1 reads a status of the interrupt control unit 15 to determine an interrupt factor. As a result of determination, if the interrupt factor is the read end interrupt, the CPU 1 resets the read end interrupt mask to release the interrupt. When the process is to be continued, the CPU 1 re-sets a read start address and read end address in the register 101, and the read address generation unit 14 outputs a read enable signal Ren and the like accordingly. After that, the interrupt control unit 15 sets a read end interrupt mask.

On the other hand, as a result of reading the status of the interrupt control unit 15, if the interrupt factor is the write end interrupt, the CPU 1 resets the write end interrupt mask to release the interrupt. When the process is to be continued, the CPU 1 re-sets a write start address and write end address in the register 101, and the write address generation unit 16 outputs a write enable signal Wen and the like accordingly. After that, the interrupt control unit 15 sets a write end interrupt mask.

When data is read out from the RAM 7, the arbiter 5 returns a RAM data valid signal PVALID to the image processing module 4 as a request source. In the image processing module 4 as the request source, the arbiter 13 returns a data valid signal Rvalid to the read buffer 10. The read buffer 10 stores data included in a RAM data output signal PDIN while this data valid signal Rvalid is output. In this manner, data, which is read out from the RAM 7 based on an address indicated by a signal PADD (=Rad) (an address generated by the read address generation unit 14), is stored in the read buffer 10.

On the other hand, when data is written in the RAM 7, the arbiter 5 returns a RAM data valid signal PVALID to the image processing module 4 as a request source in synchronism with a write timing of the RAM 7. In the image processing module 4 as the request source, the arbiter 13 returns a data valid signal Wvalid to the write buffer 12. The write buffer 12 outputs data to be written using a RAM data input signal PDOUT while the data valid signal Wvalid is output. In this manner, data in the write buffer 12 is stored at an address in the RAM 7 indicated by a signal PADD (=Wad) (an address generated by the write address generation unit 16).

When all data required for the process of the sub-module 11 are stored, the read buffer 10 outputs a valid signal valid_out; otherwise, it resets the valid signal valid_out. The read buffer 10 sequentially outputs stored data to the line data_out in synchronism with clocks unless it receives a hold request signal stall_in from the sub-module 11. Note that when the read buffer 10 receives the hold request signal stall_in from the sub-module 11, it does not update data to be output to the line data_out. A hold request signal stall_out output from the sub-module 11 is input to the hold request signal stall_in of the read buffer 10. On the other hand, when the sub-module 11 is ready to output processed data to the write buffer 12, it outputs a valid signal valid_out; otherwise, it resets the valid signal valid_out. The sub-module 11 sequentially outputs stored data to the line data_out in synchronism with clocks unless it receives a hold request signal stall_in from the write buffer 12. When the sub-module 11 receives the hold request signal stall_in from the write buffer 12, it does not update data to be output to the line data_out. Note that a hold request signal stall_out output from the write buffer 12 is input to the hold request signal stall_in of the sub-module 11. Data exchange processes between the sub-modules 11 are executed in the same manner as the sequence between the sub-module 11 and the read buffer 10 or write buffer 12.

The sub-module 11 receives data from the read buffer 10 or another sub-module 11 via the line data_in while the read buffer 10 or the other sub-module 11 outputs a valid signal valid_out. The sub-module 11 outputs data to the write buffer or another sub-module 11 via the line data_in while it outputs a valid signal valid_out. Note that when data exchange processes are disabled, the sub-module 11 outputs a hold request signal stall_out. Thus, the sub-module 11 sets a hold request signal stall_in of the read buffer 10 or another sub-module 11 as a data transmission source to hold the output from the read buffer 10. When the write buffer 12 or another sub-module 11 cannot receive data, it outputs a hold request signal stall_out. Thus, the write buffer 12 or the other sub-module 11 sets a hold request signal stall_in of the sub-module 11 as a data transmission source to hold the output from the sub-module 11. The data input/output order among the read buffer 10, sub-module 11, and write buffer 12 is managed by the switch matrix according to the settings in the register 101. Then, according to this order, the lines data_in and data_out, valid_in and valid_out, and stall_in and stall_out are connected to input/output data. Note that the read buffer 10 and write buffer 12 may include, for example, FIFOs if input or output data need not be sorted.

As described above, the internal arrangement of the image processing module 4 includes one or more sub-modules 11. Between the respective sub-modules 11, data exchange processes are implemented by the aforementioned operations (handshakes using a valid signal valid and hold request signal stall (the lines "_in" of a certain module are connected to the lines "_out" of another module)). These sub-modules 11 are configured focusing attention on hardware resources required for various image processes. Thus, since the connection relationship, processing sequence, arithmetic precision, and the like of the sub-modules can be changed as needed, a compact and flexible image processing apparatus which can cover various processing modes can be configured. Since clocks to an unused sub-module 11 can be stopped, and power supply to an unused sub-module 11 can also be stopped, not only the processing speed and processing precision can be improved, but also consumption power can be suppressed.

Note that when the image processing module 4 is configured to be compatible with a variety of formats, divisional processes (multi-sequence processes) can be implemented. In this case, another module or the CPU is configured to execute even processes incompatible with the aforementioned hardware resources. Basically, it is desired to standardize the format of input data and output data among the read buffer 10, each sub-module 11, and write buffer 12. When the format is standardized, even when the processing order of sub-modules is to be replaced, or a specific sub-module is disabled, the input/output data format of data among the read buffer 10, each sub-module 11, and write buffer 12 remains unchanged.

Figure 4:
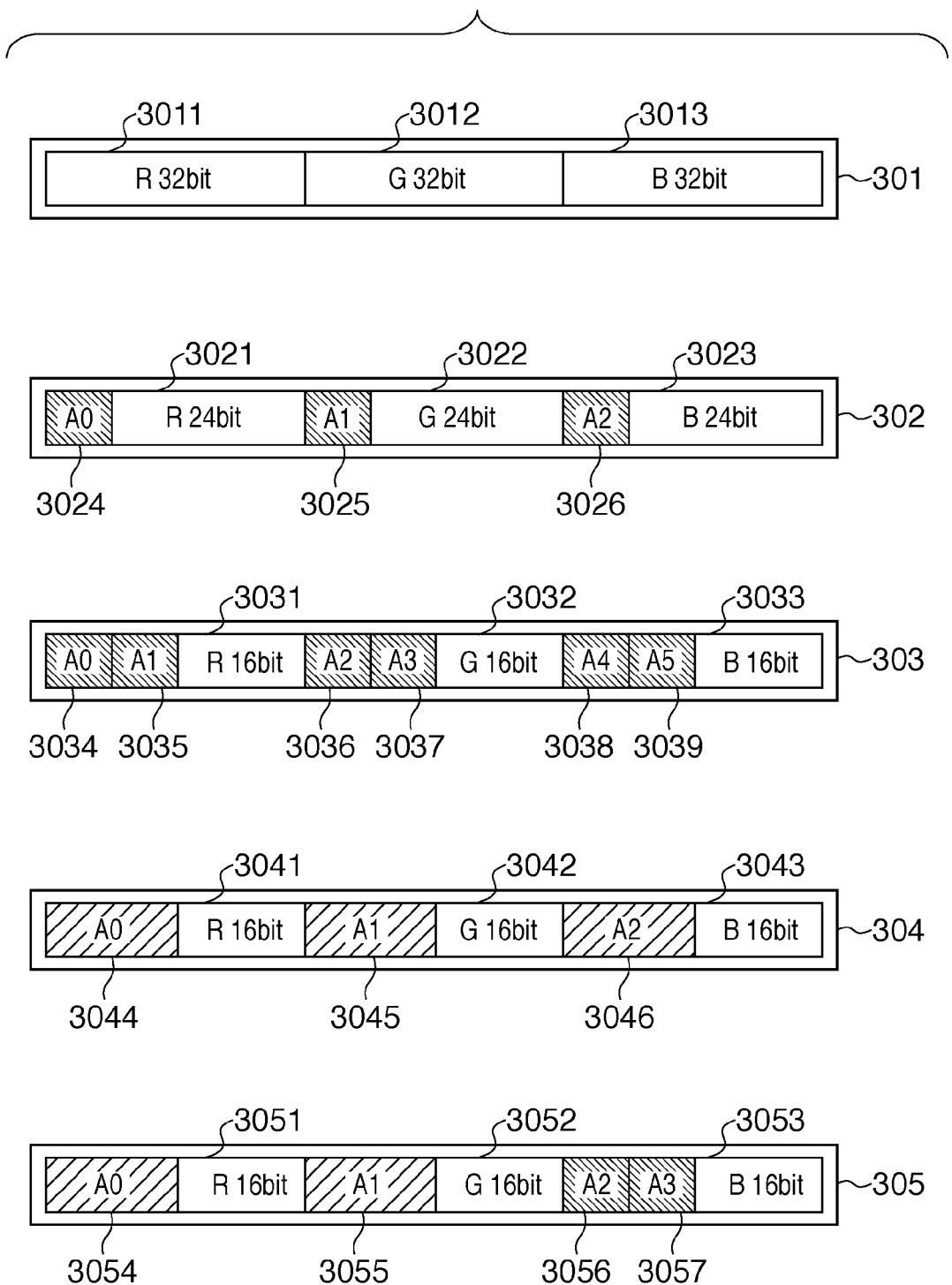
FIG. 4 is a view showing examples of the formats of processing image data according to an embodiment.

FIG. 4 is a view showing examples of the input/output data format according to this embodiment. This format (to be referred to as processing image data hereinafter) is shared and used between, for example, the aforementioned sub-modules 11 and the switch matrix 17.

A format of processing image data 301 does not have any attribute values. This format is the same as that in the related art. This processing image data 301 includes R (red), G (green), and B (blue) pixel fields 3011 to 3013 each having 32-bit pixel values, and has a total length of 96 bits.

A format of processing image data 302 has three 8-bit attribute value fields 3024 to 3026 and three 24-bit pixel value fields 3021 to 3023. In this embodiment, various setting values (attribute values) are set in these attribute value fields. Types and roles of attribute values are not fixed, and free values are set. For example, values indicating an image processing module and a process to be executed by that image processing module, values indicating a field to be referred to of the attribute value fields, and a process to be executed with reference to that field, and the like can be set.

A format of processing image data 303 has six 8-bit attribute value fields 3034 to 3039, and three 16-bit pixel value fields 3031 to 3033. A format of processing image data 304 has three 16-bit attribute value fields 3044 to 3046, and three 16-bit pixel value fields 3041 to 3043. A format of processing image data 305 has two 16-bit attribute value fields 3054 and 3055, two 8-bit attribute value fields 3056 and 3057, and three 16-bit pixel value fields 3051 to 3053.

In this embodiment, each of these processing image data 301 to 305 is configured to have a 96-bit format as a whole. For this reason, when an attribute value dynamic range is broadened (when the number of bits of each attribute value field is increased), a pixel value dynamic range is narrowed (the number of bits of each pixel value field is decreased), and the attribute values and pixel values have a tradeoff relationship between them.

In consideration of such relationship, the configuration of the processing image data 301 has the format that can maintain the highest precision of pixel values. Also, the configuration of the processing image data 302 has the format that can maintain high precision of pixel values, and can also use attribute values. The configuration of the processing image data 303 has the format in which the number of attribute values to be held by each pixel is further increased. The configuration of the processing image data 304 has the format in which attribute values and pixel values have the same dynamic ranges, and control based on attribute values with higher precision can be implemented. The configuration of the processing image data 305 has the format which has attribute value fields of two different sizes, and can combine and use large and small attribute value fields as needed.

Using the aforementioned processing image data, different image processes can be executed in various use cases. More specifically, using attribute values, different image processes can be executed using the same resources. Then, flexibility of image processes and a circuit size reduction can be attained.

The formats of the processing image data have been described. However, the aforementioned formats are merely examples, and the present invention is not limited to these formats. For example, in one format taken as an example, each pixel value field is defined by 32 bits, and a total size is defined by 96 bits. However, other pixel value field sizes and total sizes may be used. For example, each pixel value field may be defined by 16 bits, and a total size may be defined by 48 bits. The respective pixel value fields need not always have the same number of bits. For example, the respective pixel value fields may have uneven sizes like R: 10 bits, G: 12 bits, and B: 10 bits. Note that each format (processing image data) shown in FIG. 4 is generated by, for example, the CPU 1 (or image processing module 4). More specifically, the CPU 1 has a function of editing image data that expresses an image to generate processing image data including, in correspondence with each pixel of the image, pixel value fields that hold pixel values of the pixel and attribute value fields that hold attribute values.

Figure 5:
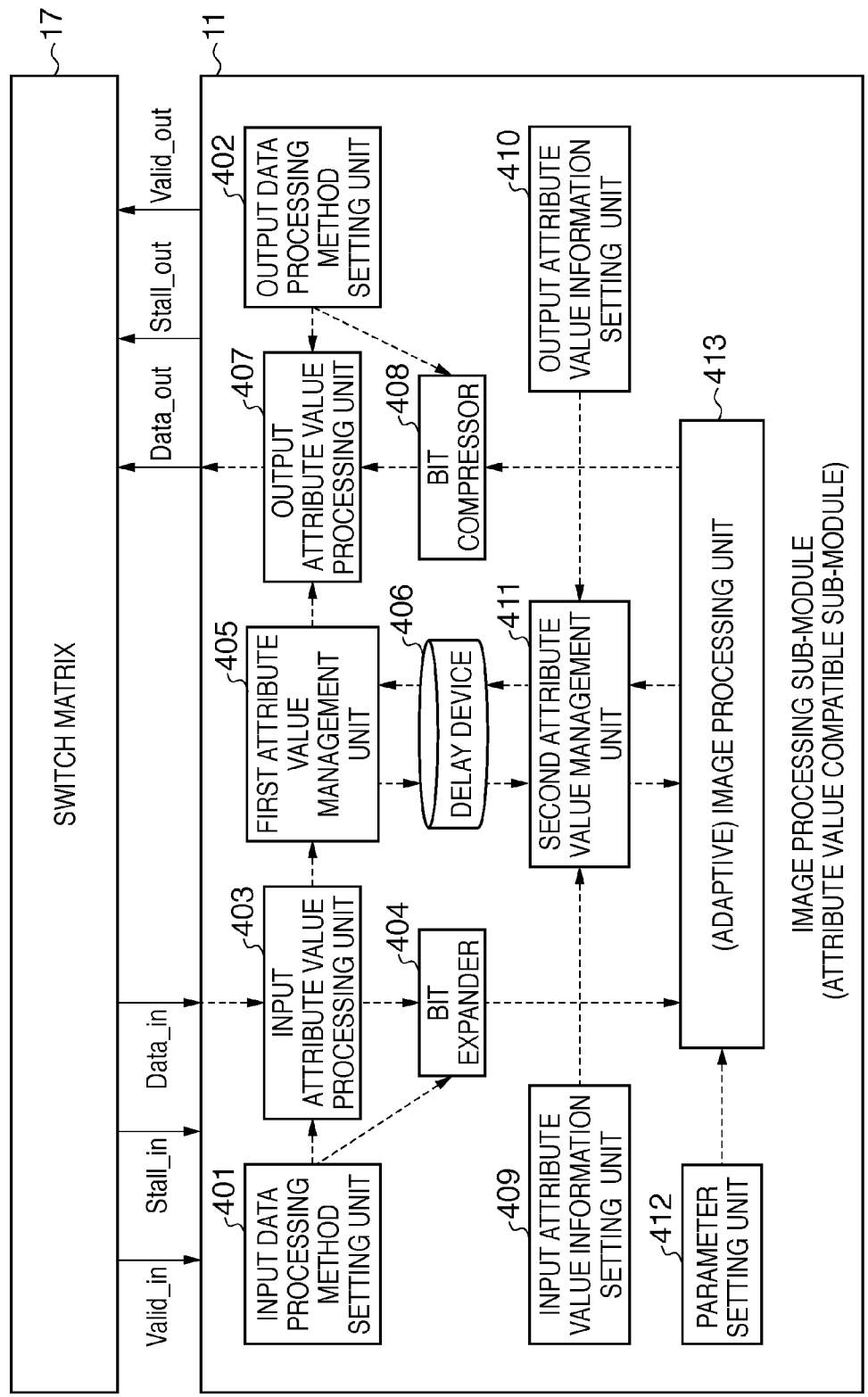
FIG. 5 is a block diagram showing an example of the arrangement of a sub-module.
Figure 6:
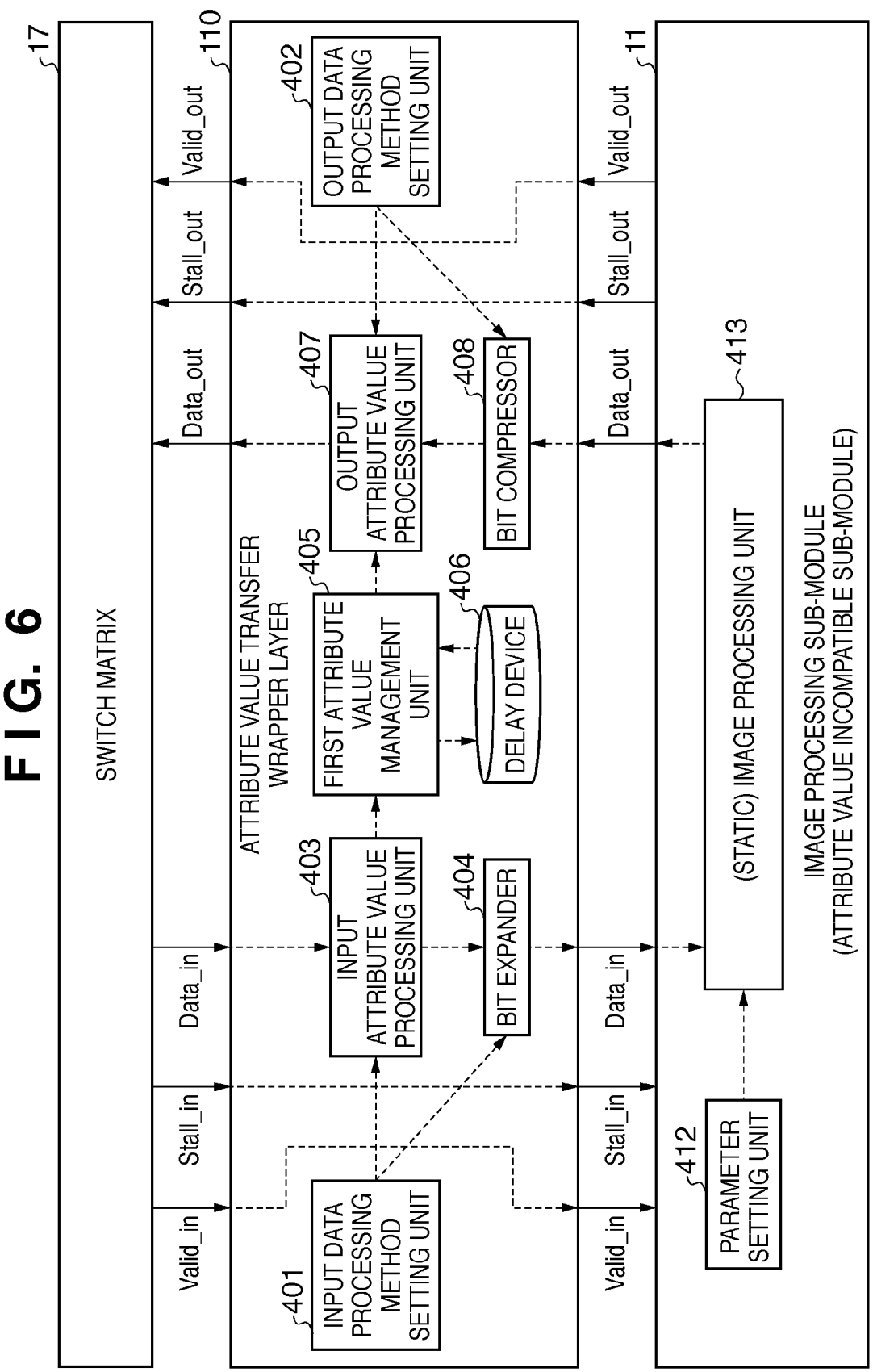
FIG. 6 is a block diagram showing an example of the arrangement including an attribute value transfer wrapper layer 110.

The arrangement of the sub-module which executes image processes (to be referred to as an image processing sub-module hereinafter) will be described below with reference to FIG. 5. The image processing sub-module is implemented as the sub-module 11 shown in FIG. 3. Note that the same reference numerals in FIG. 5 denote the same components as those shown in FIG. 3 above.

An input data processing method setting unit 401 sets a processing method for input attribute values and input pixel values with reference to the parameters set in the register 101. Note that the processing image data including the input attribute values and input pixel values is input using a Data_in control signal from the switch matrix 17.

An output data processing method setting unit 402 sets a processing method for output attribute values and output pixel values with reference to the parameters set in the register 101. Note that the processing image data including the output attribute values and output pixel values are output to the switch matrix 17 using a Data_out control signal. The processing methods for the input processing image data and output processing image data are set when the CPU 1 sets setting values associated with the read buffer 10, respective sub-modules 11-$n$, and write buffer 12 in the configuration register 101. This setting method is not particularly limited. For example, signal lines from the respective image processing modules 4 to the CPU 1 are set to be bidirectional lines. Then, the CPU 1 and the registers 101 of the image processing modules 4 are connected, and the CPU 1 may directly make settings in the configuration registers 101. Also, the CPU 1 and the switch matrices 17 of the respective image processing modules 4 may be connected, and the CPU 1 may make settings via the switch matrices 17 by executing a register setting command. Note that setting methods of all kinds of settings to be described below are not particularly limited.

An input attribute value processing unit 403 edits input attribute values included in the input processing image data. A Bit expander 404 Bit-expands the input pixel values included in the input processing image data to a format suited to the processing of the image processing unit 413. Note that the processes in the input attribute value processing unit 403 and Bit expander 404 are executed based on information (first information) set by the input data processing method setting unit 401.

A first attribute value management unit 405 controls a delay device 406 to hold the input attribute values processed by the input attribute value processing unit 403. Upon outputting the output attribute values, the first attribute value management unit 405 outputs the output pixel values to an output attribute value processing unit 407 at a predetermined timing. This output timing has to be synchronized with the electrical arrangement of the image processing unit 413.

For example, assume that the image processing unit 413 executes the following process. Input pixels: three continuous input pixels (pixel (X−1), pixel (X), and pixel (X+1))
Output pixel: a position of pixel X
Output value: a sum of three pixels
Pixel value (X−1)+pixel value (X)+pixel value (X+1)
Attribute value: not particularly processed; output attribute value (X)=input attribute value (X)

In this case, although an output attribute value (X) is used to calculate an output value, a final output value is decided at an input timing of a pixel (X+1). For this reason, the first attribute value management unit 405 extracts the attribute value (X) already held by the delay device 406 at a timing at which an output pixel value (X) is sent from the image processing unit 413 to the output attribute value processing unit 407, and outputs that value to the output attribute value processing unit 407. That is, until an arithmetic operation of the output pixel value (X) using the pixel (X+1) input after the pixel (X) is completed, the delay device 406 holds the attribute value (X) as that of the output pixel value (X). After that, the delay device 406 similarly holds a value as an attribute value of the output pixel value (X) until the output timing of the output pixel value (X) is reached.

The delay device 406 holds attribute values (input and output attribute values), as described above. The delay device 406 is arranged to delay input and output attribute values. The process by this delay device 406 will be described below while taking a practical example.

For example, assume that the image processing unit 413 executes the following process.
Input pixels: three continuous input pixels (pixel (X−1), pixel (X), and pixel (X+1))
  Output pixel: a position of pixel X
  Output value: divide a sum of three pixels by an attribute value
    (Pixel value (X−1)+pixel value (X)+pixel value (X+1)) ÷attribute value (X)
  Attribute value: not particularly processed; output attribute value (X)=input attribute value (X)

In this case, the image processing unit 413 requires an input attribute value (X) at an input timing of an input pixel value (X+1). For this purpose, the delay device 406 delays input of the input attribute value (X) to the image processing unit 413.

The output attribute value processing unit 407 edits the output attribute values output from the image processing unit 413. A Bit compressor 408 Bit-compresses output pixel values included in the output processing image data to an output format. Note that the processes in the output attribute value processing unit 407 and Bit compressor 408 are executed based on information (second information) set by the output data processing method setting unit 402.

An input attribute value information setting unit 409 sets information (third information) that specifies which of input attribute values held by the delay device 406 is to be used in the image process by the image processing unit 413, with reference to the parameters set in the register 101. That is, the input attribute value information setting unit 409 sets information indicating one of pixel values in a plurality of pixel value fields and one of attribute values in a plurality of attribute value fields, which are to be associated with each other and are to be input to the image processing unit 413.

An output attribute value information setting unit 410 sets information (fourth information) that specifies in which attribute value field the output attribute value held by the delay device 406 is to be set with reference to the parameters set in the register 101. That is, the output attribute value information setting unit 410 sets information indicating which of a plurality of attribute value fields is to be associated with each of the plurality of pixel value fields processed by the image processing unit 413. In other words, the output attribute value information setting unit 410 sets attribute value fields of the output attribute values processed by the image processing unit 413.

A second attribute value management unit 411 manages input and output attribute values in the image processing unit 413. This management is executed based on the pieces of information set by the input attribute value information setting unit 409 and output attribute value information setting unit 410. For example, the second attribute value management unit 411 extracts an input attribute value from the delay device 406 and outputs it to the image processing unit 413. Also, for example, the second attribute value management unit 411 controls the delay device 406 to hold an output attribute value output from the image processing unit 413.

A parameter setting unit 412 sets processing parameters unique to an image process with reference to the parameters set in the register 101. The image processing unit 413 executes an image process (adaptive image process) for respective pixels according to attribute values. More specifically, the image processing unit 413 executes a predetermined image process using input pixel values, input attribute values, parameters, and the like input from the Bit expander 404, second attribute value management unit 411, parameter setting unit 412, and the like. The image processing unit 413 outputs output pixel values to the Bit compressor 408 as needed, and outputs output attribute values to the second attribute value management unit 411 as needed. Note that the image processing unit 413 according to this embodiment inputs and outputs pixel values (R/G/B), and processes them as 32-bit data. Therefore, when attribute values are to be used, the Bit expander 404 performs expansion from "16 bits" or "24 bits" to "32 bits". Conversely, the Bit compressor 408 performs compression from "32 bits" to "16 bits" or "24 bits". That is, the numbers of bits are adjusted (in this case, a ratio between the number of bits of attribute value fields and that of pixel value fields is changed). Note that such Bit relationship need not always be adopted, and the number of Bits in the image process of the image processing unit 413 may be smaller than that of pixel values extracted by the input attribute value processing unit 403. Such case can be coped with by replacing the positions of the Bit expander 404 and Bit compressor 408 shown in FIG. 5 with each other. The Bit expansion and compression methods may use bit shift operations or may use multiplications or divisions.

As described above, in this embodiment, the Bit expander 404 and Bit compressor 408 are arranged, and even when the processing image data hold pixel value fields (that is, pixels) having the different numbers of bits, the number of Bits is adjusted to a constant value in the input and output stages of the image processing unit 413. In this way, the image process using an identical resource (image processing unit) can be implemented independently of the number of Bits of attribute values and that of pixel values.

The arrangement of the image processing sub-module has been described. However, in the image processing sub-module, not all the aforementioned components are indispensable. For example, when one pixel is input, undergoes a predetermined image process, and is output, the need for the delay device 406 is obviated. At this time, the first and second attribute value management units 405 and 411 may be integrated. Furthermore, the aforementioned image processing sub-module changes the settings of attribute values. Alternatively, a module which executes an image process simply using attribute values may be configured. In this case, the need for the output attribute value information setting unit 410 can be obviated. Likewise, when a module which does not use any attribute values in an image process and only changes the settings of attribute values is configured, the need for the input attribute value information setting unit 409 can be obviated.

Note that the arrangement shown in FIG. 3 includes a plurality of sub-modules. When these sub-modules include a sub-module incompatible with attribute values (to be referred to as an attribute value incompatible sub-module hereinafter), that module is likely to handle attribute values as pixel values. In this case, a correct output result cannot be obtained. An arrangement which copes with such module will be described below with reference to FIG. 6.

An attribute value transfer wrapper layer 110 is arranged between an attribute value incompatible sub-module 11 and the switch matrix 17. The attribute value transfer wrapper layer 110 is located as an intermediate layer (that is, it severs as an intermediate processing module) between the switch matrix 17 and attribute value incompatible sub-module 11, and serves to transfer attribute values. In this way, the attribute value incompatible sub-module 11 can behave as if it were an attribute value compatible sub-module. Note that respective units denoted by reference numerals 401 to 408 in the attribute value transfer wrapper layer 110 have functions equivalent to those described in FIG. 5, and a description thereof will not be repeated.

The parameter setting unit 412 sets processing parameters unique to an image process with reference to the parameters set in the register 101. The image processing unit 413 executes a uniform image process for respective pixels (static image process). More specifically, the image processing unit 413 executes a predetermined image process using input pixel values, parameters, and the like input from the Bit expander 404, parameter setting unit 412, and the like. The image processing unit 413 outputs output pixel values to the Bit compressor 408 as needed. Note that of control signals between the switch matrix 17 and attribute value incompatible sub-module, Valid_in, Stal_in, Stall_out, and Valid_out signals may be directly connected between them without the intervention of the attribute value transfer wrapper layer 110.

A Data_in signal from the attribute value transfer wrapper layer 110 to the attribute value incompatible sub-module 11 includes only input pixel values. This is because the input attribute value processing unit 403 and Bit expander 404 of the attribute value transfer wrapper layer 110 exclude attribute values. Also, a Data_out signal from the attribute value incompatible sub-module 11 to the attribute value transfer wrapper layer 110 includes only output pixel values.

With the above arrangement, a mechanism that transfers attribute values without changing the image processing unit 413 can be implemented. If the image processing unit 413 performs a 32-bit arithmetic process, a Bit width of pixel values is reduced by attribute values, but the precision of the image process remains the same. Since the attribute value transfer wrapper layer 110 is arranged, the image processing module 4 including both attribute value compatible sub-modules and attribute value incompatible sub-modules can be configured. Thus, using a common format (that is, processing image data), both a high-precision (static) image process using the large number of bits and an adaptive image process (although the number of bits is relatively reduced) can be implemented.

The information set by the input data processing method setting unit 401 will be described below using "Table 1". That is, the input attribute value processing unit 403 and Bit expander 404 execute various processes based on the information of this "Table 1". Note that setting values shown in "Table 1" are examples, and the present invention is not limited to these specific values.

TABLE 1

| Input data processing method | Operation | |
|---|---|---|
| | Setting of attribute value field | Setting of pixel value field |
| Get_Mode 10 | None: always set 0 | 32 bits: use field intact |

TABLE 1-continued

| Input data processing method | Operation | |
|---|---|---|
| | Setting of attribute value field | Setting of pixel value field |
| Get_Mode 11 | 8 bits: always set 0 | 24 bits → 32 bits: use expanded field |
| Get_Mode 12 | 8 bits: set extracted value | |
| Get_Mode 13 | 16 bits: always set 0 | 16 bits → 32 bits: use expanded field |
| Get_Mode 14 | 16 bits: set extracted value | |

[Get_Mode 10]

This setting is suited to the case in which the processing image data has the format 301 shown in FIG. 4. In this case, the whole processing image data (that is, 96 bits) is configured by pixel value fields (32-bit pixel value field×3). With this setting, the input attribute value processing unit 403 sets all "0"s (standard value) in attribute value fields. In this case, since a pixel value is a 32-bit value, the Bit expander 404 does not operate.

[Get_Mode 11]

This setting is suited to the case in which the processing image data has the format 302 shown in FIG. 4. In this case, the processing image data (that is, 96 bits) is configured by a 24-bit pixel value field×3 and an 8-bit attribute value field×3. With this setting, the input attribute value processing unit 403 sets (overwrites) all "0"s (standard value) in the attribute value fields. Then, the image processing unit 413 executes a static image process in place of an adaptive image process. In this case, since a pixel value is 24-bit value, the Bit expander 404 performs Bit expansion from "24 bits" to "32 bits". This setting "Get_Mode 11" is used by a module which serves to generate processing contents of another sub-module as attribute values and to set them. For example, a sub-module which executes "Get_Mode 11" executes a process for extracting features of an image (for example, determination of an edge part), and outputs the features together with original pixel values. In this case, in the sub-module which executes "Get_Mode 11", the image processing unit 413 extracts image features based on pixel values in pixel value fields. Then, the image processing unit 413 generates determination results as attribute values, and sets the generated attribute values in attribute value fields. Also, the image processing unit 413 sets pixel values which are neither modified nor corrected in pixel value fields. After that, the output attribute value processing unit 407 outputs processing image data. This processing image data is transferred to a subsequent sub-module via the switch matrix 17. Then, the subsequent sub-module decides processing contents for pixel values using the attribute values set in the attribute value fields of the received processing image data, and adaptively executes an image process. Also, with this "Get_Mode 11" setting, since the input attribute value processing unit 403 sets "0" in the attribute value fields, propagation of attribute values can be aborted. Note that when only propagation of attribute values is to be aborted, since processing image data with attribute value fields set with "0" need only be output, the output side of attribute values, that is, the output attribute value processing unit 407 may execute this process (0 padding). Furthermore, when propagation of attribute values is to be aborted, and newly generated attribute values are to be set in attribute value fields, the input attribute value processing unit 403 need not set "0" as attribute values. More specifically, the image processing unit 413 executes an image process without using any attribute values, and the output side of attribute values, that is, the output attribute value processing unit 407 sets newly generated attribute values in attribute value fields. Then, the output attribute value processing unit 407 outputs processing image data. When "Get_Mode 11" is set, since the process is closed in only one sub-module, a possibility of intervention of human errors can be reduced.

[Get_Mode 12]

This setting is suited to the case in which the processing image data has the format 302 shown in FIG. 4. With this setting, the input attribute value processing unit 403 sets attribute values included in the input processing image data intact. The "Get_Mode 12" setting is used, for example, when an adaptive image process is executed using attribute values.

[Get_Mode 13]

This setting attains substantially same operation as "Get_Mode 11" described above. This setting is suited when the processing image data has the formats 303 to 305 shown in FIG. 4. A difference from "Get_Mode 11" lies in the numbers of Bits of attribute values and pixel values. When "Get_Mode 13" is set, a degree of Bit expansion by the Bit expander 404 is expansion from "16 bits" to "32 bits".

[Get_Mode 14]

This setting attains substantially same operation as "Get_Mode 12" described above. This setting is suited when the processing image data has the formats 303 to 305 shown in FIG. 4. A difference from "Get_Mode 12" lies in the numbers of Bits of attribute values and pixel values. When "Get_Mode 14" is set, a degree of Bit expansion by the Bit expander 404 is expansion from "16 bits" to "32 bits".

The information set by the output data processing method setting unit 402 will be described below using "Table 2". That is, the output attribute value processing unit 407 and Bit compressor 408 execute various processes based on the information of this "Table 2". Note that setting values shown in "Table 2" are examples, and the present invention is not limited to these specific values.

TABLE 2

| Output data processing method | Setting of attribute value field | Setting of pixel value field |
|---|---|---|
| Put_Mode 20 | None | 32 bits: use field intact |
| Put_Mode 21 | 8 bits: always set 0 | 32 bits → 24 bits: use compressed field |
| Put_Mode 22 | 8 bits: set attribute value | 32 bits → 24 bits: use compressed field |
| Put_Mode 23 | 16 bits: always set 0 | 32 bits → 16 bits: use compressed field |
| Put_Mode 24 | 16 bits: set attribute value | 32 bits → 16 bits: use compressed field |

[Put_Mode 20]

This setting is suited to the case in which the processing image data to be output has the format 301 shown in FIG. 4. In this case, the whole processing image data (that is, 96 bits) is configured by pixel value fields (32-bit pixel value field×3). With this setting, the output attribute value processing unit 407 does not set any attribute values. In this case, since a pixel value is a 32-bit value, the Bit compressor 408 does not operate.

[Put_Mode 21]

This setting is suited to the case in which the processing image data to be output has the format 302 shown in FIG. 4. In this case, the processing image data (that is, 96 bits) is configured by a 24-bit pixel value field×3 and an 8-bit attribute value field×3. With this setting, the output attribute value processing unit 407 sets (overwrites) all "0"s (standard value) in the attribute value fields. Then, processing image data_in which attribute values are invalid is output to another sub-module. Since a pixel value is 32-bit value, the Bit compressor 408 performs Bit compression from "32 bits" to "24 bits". This setting "Put_Mode 21" is used when the self module (the sub-module of interest) executes an adaptive image process using attribute values, but another sub-module executes a static image process without using any attribute values. With the "Put_Mode 21" setting, since "0" is set in the attribute value fields, propagation of attribute values can be aborted. Note that the input side of attribute values, that is, the input attribute value processing unit 403 may execute this process (0 padding). When "Put_Mode 21" is set, a probability of occurrence of adverse effects in another attribute value incompatible sub-module can be reduced.

[Put_Mode 22]

This setting attains substantially the same operations as in "Put_Mode 21" described above. This setting is suited to the case in which the processing image data has the format 302 shown in FIG. 4. With this setting, the output attribute value processing unit 407 sets attribute values using those output from the image processing unit 413 intact. Since a pixel value is a 32-bit value, the Bit compressor 408 performs Bit compression from "32 bits" to "24 bits". The "Put_Mode 22" setting is used in, for example, a module which serves to generate processing contents of another sub-module as attribute values and to set them.

[Put_Mode 23]

This setting attains substantially same operation as "Put_Mode 21" described above. This setting is suited when the processing image data has the formats 303 to 305 shown in FIG. 4. A difference from "Put_Mode 21" lies in the numbers of Bits of attribute values and pixel values. When "Put_Mode 23" is set, a degree of Bit compression by the Bit compressor 408 is compression from "32 bits" to "16 bits".

[Put_Mode 24]

This setting attains substantially same operation as "Put_Mode 22" described above. This setting is suited when the processing image data has the formats 303 to 305 shown in FIG. 4. A difference from "Put_Mode 22" lies in the numbers of Bits of attribute values and pixel values. When "Put_Mode 24" is set, a degree of Bit compression by the Bit compressor 408 is compression from "32 bits" to "16 bits".

As described above, when the processes are executed using the information shown in "Table 2", use/non-use of attribute values in an attribute value compatible sub-module can be controlled. Thus, various image processes can be executed using an identical resource (image processing unit). Also, since which field in the processing image data is used for attribute values or pixel values can be freely designed, sub-modules can be used in various intended purposes while achieving flexibility of the image process design.

The information set by the input attribute value information setting unit 409 will be described below using "Table 3". The second attribute value management unit 411 executes various processes based on the information in this "Table 3" prior to the beginning of an image process. In this case, information when the format 302 (three attribute value fields) shown in FIG. 4 is used will be exemplified below.

TABLE 3

| Input attribute value information setting | Attribute values (A0/A1/A2) used for respective pixel values | | |
|---|---|---|---|
| | For pixel value R | For pixel value G | For pixel value B |
| Int_Mode 30 | | Not use | |
| Int_Mode 31 | | Use A0 | |
| Int_Mode 32 | | Use A1 | |
| Int_Mode 33 | | Use A2 | |
| Int_Mode 34 | Use A0 | Use A1 | Use A2 |

[In_Mode 30]

This setting does not use any attribute values in an image process. That is, the second attribute value management unit 411 does not input any attribute values to the image processing unit 413. In this case, a sub-module serves as an attribute value incompatible sub-module. This setting is suited, for example, when the image processing unit 413 executes a static image process. Various methods of controlling the image processing unit 413 to execute a static image process are available. For example, attribute values to be transferred to the image processing unit 413 may be set to be all "0"s (standard value). When "Get_Mode 11" shown in "Table 1" is set, "0" can be set in attribute value fields. However, when "In_Mode 30" is set, since it does not change attribute values themselves received from another sub-module to "0", propagation of attribute values is continued.

[In_Mode 31]

This setting is suited when an adaptive image process is executed for all pixel value fields (3 channels) using only an attribute value field A0 of a plurality of attribute value fields (A0 to A2). When "In_Mode 31" is set, the image process is executed without using other attribute value fields (A1, A2). When "In_Mode 31" is set, an adaptive image process can be executed for all the channels (RGB) of pixel value fields using a single attribute value. Note that the field A0 corresponds to the attribute value field 3024 of the format 302 shown in FIG. 4, the field A1 corresponds to the attribute value field 3025 of the format 302 shown in FIG. 4, and the field A2 corresponds to the attribute value field 3026 of the format 302 shown in FIG. 4. In the following first to fifth embodiments, the fields A0 to A2 respectively indicate the attribute value fields 3024 to 3026.

[In_Mode 32]

This setting is suited when an adaptive image process is executed for all pixel value fields (3 channels) using only the attribute value field A1 of the plurality of attribute value fields (A0 to A2). When "In_Mode 32" is set, the image process is executed without using other attribute value fields (A0, A2). When "In_Mode 32" is set, an adaptive image process can be executed for all the channels (RGB) of pixel value fields using a single attribute value.

[In_Mode 33]

This setting is suited when an adaptive image process is executed for all pixel value fields (3 channels) using only the attribute value field A2 of the plurality of attribute value fields (A0 to A2). When "In_Mode 33" is set, the image process is executed without using other attribute value fields (A0, A1). When "In_Mode 33" is set, an adaptive image process can be executed for all the channels (RGB) of pixel value fields using a single attribute value.

[In_Mode 34]

This setting is suited when an adaptive image process is executed using the attribute value field A0 for a pixel value R, the attribute value field A1 for a pixel value G, and the attribute value field A2 for a pixel value B.

As described above, when the process is executed by selectively using "In_Mode 30" to "In_Mode 34", an adaptive image process can be executed using information of at least one of the plurality of attribute value fields. Note that the setting values shown in "Table 3" are merely examples, and the present invention is not limited to these specific values. For example, when pixel values include brightness (Y) information and color (Cb/Cr) information like Y, Cb, and Cr in place of R, G, and B, an adaptive image process may be executed using the attribute value field A0 for brightness, and the attribute value field A1 for colors. In this case, an attribute value used by, for example, another sub-module may be set in the attribute value field A2.

The information set by the output attribute value information setting unit 410 will be described below using "Table 4". The second attribute value management unit 411 executes various processes based on the information of this "Table 4" after completion of the image process. In this case, the information when the format 303 (six attribute value fields) shown in FIG. 4 is used will be exemplified below.

TABLE 4

| Output attribute value information setting | Setting method of respective attribute values (A0/A1/A2) | | |
|---|---|---|---|
| | Attribute value A0 | Attribute value A1 | Attribute value A2 |
| Out_Mode 40 | | * | |
| Out_Mode 41 | Set | | * |
| Out_Mode 42 | * | Set | * |
| Out_Mode 43 | | * | Set |
| Out_Mode 44 | | Set | |

* An input attribute value is used as an output attribute value

[Out_Mode 40]

This setting is suited when a self module (sub-module of interest) does not set any attribute values. That is, output attribute values use input attribute values intact, and they assume the same values. [0120][Out_Mode 41]

This setting is suited when only the attribute value field A0 of the plurality of attribute value fields (A0 to A2) is newly set. When "Out_Mode 41" is set, other attribute value fields (A1, A2) are not updated.

[Out_Mode 42]

This setting is suited when only the attribute value field A1 of the plurality of attribute value fields (A0 to A2) is newly set. When "Out_Mode 42" is set, other attribute value fields (A0, A2) are not updated.

[Out_Mode 43]

This setting is suited when only the attribute value field A2 of the plurality of attribute value fields (A0 to A2) is newly set. When "Out_Mode 43" is set, other attribute value fields (A0, A1) are not updated.

[Out_Mode 44]

This setting is suited when all of the plurality of attribute value fields A0 to A2 are newly set.

As described above, when the process is executed by selectively using "Out_Mode 40" to "Out_Mode 44", the setting of information of at least one of the plurality of attribute value fields can be changed. Thus, another sub-module can execute an adaptive image process. Note that the setting values shown in "Table 4" are merely examples, and the present invention is not limited to these specific values. For example, when pixel values include brightness (Y) information and color (Cb/Cr) information like Y, Cb, and Cr in place of R, G, and B, different attribute values may be set in the attribute value field A0 in association with brightness and in the attribute value field A1 in association with colors. In this case, an attribute value or the like used by another sub-module may be set in the attribute value field A2.

Some operation examples in the image processing sub-module and some setting examples of information according to these operation examples will be described hereinafter using the first to eighth embodiments.

First Embodiment

Figure 7:
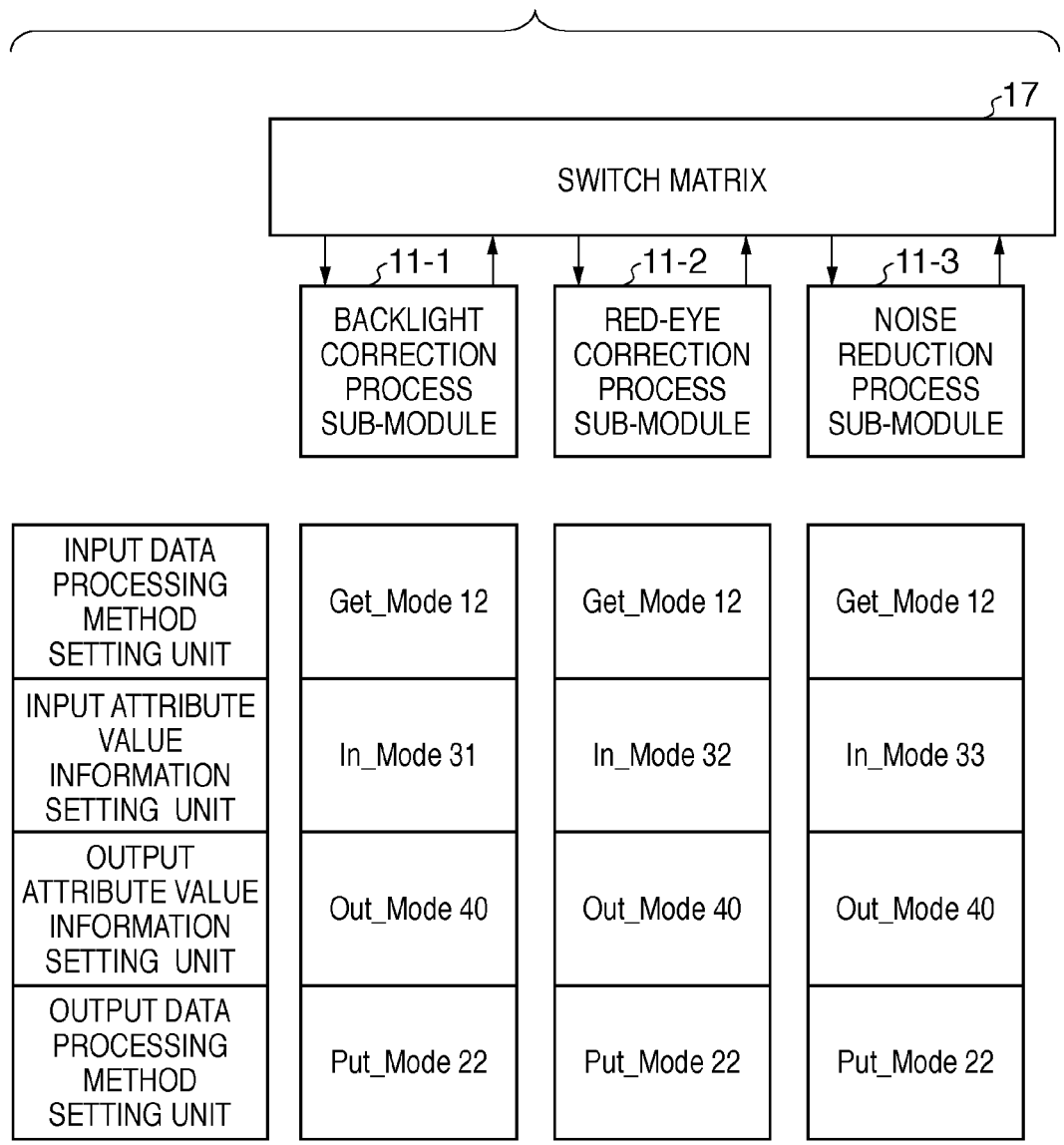
FIG. 7 is a schematic block diagram for explaining the first embodiment.

FIG. 7 shows an overview when three attribute value compatible sub-modules execute image processes respectively using three externally transferred attribute values. In this case, a case will be exemplified below wherein a backlight correction, red-eye correction, and noise reduction are executed at the time of photo printing. Assume that processing image data uses a format 302 (three attribute value fields) shown in FIG. 4.

Processes executed by the respective sub-modules will be described first. The backlight correction is a process for making a dark part brighter (for example, a tone conversion using a linear lookup table), and a correction process has to be applied to a dark part alone. The red-eye correction is a process for removing a red eye (for example, a color conversion using a three-dimensional lookup table), and a correction process has to be applied to a red-eye area alone. The noise reduction is a process for blurring a noise generation area (a smoothing process using a two-dimensional planar filter), and a correction process has to be applied to a noise generation area alone. Note that these correction processes may be implemented by arbitrary methods.

Assume that the relationship between the sub-modules and correction processes is as follows. Backlight correction process sub-module 11-1: a backlight correction process (a tone conversion process using a linear lookup table: correction=OFF when an attribute value=0; correction=ON when an attribute value=1)

Red-eye correction process sub-module 11-2: a red-eye correction process (a color conversion process using a three-dimensional lookup table: correction=OFF when an attribute value=0; correction=ON when an attribute value=1)

Noise reduction process sub-module 11-3: a noise reduction process (a smoothing process using a two-dimensional planar filter: correction=OFF when an attribute value=0; correction=ON when an attribute value=1)

Note that ON/OFF of correction is merely an example, and a value of an attribute value (0 to 255 if it is an 8-bit value) may be used as a correction intensity. In place of designating ON/OFF of correction depending on attribute values, a lookup table or filter coefficients to be referred to may be switched depending on attribute values. In this case, a first lookup table is arranged as that when correction=OFF, a second lookup table is arranged as that when correction=ON, and these tables are selectively used. Furthermore, a third lookup table may be arranged to apply a reverse correction. In this case, for example, processes such as blurring, no correction, and edge emphasis can be switched depending on attribute values.

Figure 8:
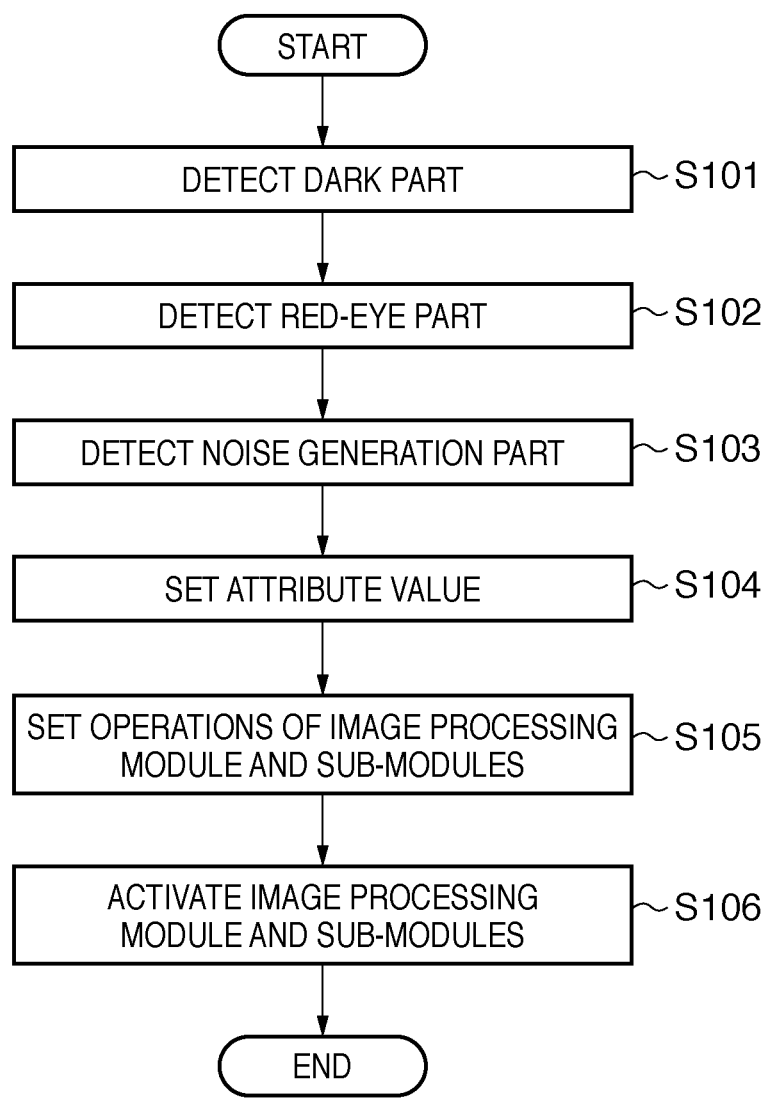
FIG. 8 is a flowchart showing an example of the sequence of image processes in the arrangement shown in FIG. 7.

An example of the sequence of the image processes (for example, at the time of photo printing) in the arrangement shown in FIG. 7 will be described below with reference to FIG. 8.

The image processing apparatus 100 controls the CPU 1 to check whether or not a photo as an image process target is a backlight photo, and to specify a dark part to be corrected (S101). After the dark part is specified, the image processing apparatus 100 controls the CPU 1 to determine if a red-eye area is generated in the photo as the image process target, and to specify a red-eye area to be corrected (S102). Also, the image processing apparatus 100 controls the CPU 1 to determine whether or not imaging noise is generated in the photo as the image process target, and to specify a noise generation area to be corrected (S103).

After the areas to be processed are specified, the image processing apparatus 100 controls the CPU 1 to set attribute values (S104). Various attribute value setting methods are available, and any of those methods may be used. For example, attribute values may be directly written in a photo (image) in a memory (RAM 7). The setting contents of attribute values are as follows. These attribute values are set for respective pixels in accordance with the detection results of the processes in steps S101 to S103 above.

Attribute value field A0: a backlight correction attribute value (0: correction=OFF, 1: correction=ON)

Attribute value field A1: a red-eye correction attribute value (0: correction=OFF, 1: correction=ON)

Attribute value field A2: a noise reduction attribute value (0: correction=OFF, 1: correction=ON)

After the attribute values are set, the image processing apparatus 100 controls the CPU 1 to set operations of the modules (image processing module 4 and sub-modules 11) (S105). At this time, the contents shown in the lower portion of FIG. 7 are set as information associated with the sub-modules 11-1 to 11-3. In addition, in the process in step S105, linear and three-dimensional lookup tables, two-dimensional filter coefficients, and the like used in the sub-modules 11-1 to 11-3 are also set.

After these settings, the image processing apparatus 100 controls the CPU 1 to activate the image processing module 4 and sub-modules 11-1 to 11-3 (S106). Then, the respective sub-modules execute various image processes independently using the attribute values. Details of the image processes executed by these sub-modules 11-1 to 11-3 are as follows:

[Backlight Correction Process Sub-Module]

Input data process: Get_Mode 12: extract attribute values A0 to A2

Attribute value input process: In_Mode 31: execute an image process based on the backlight correction attribute value A0

Attribute value output process: Out_Mode 40: not update attribute values

Output data process: Put_Mode 22: set and output the attribute values A0 to A2 (in combination with backlight correction output pixel values)

[Red-Eye Correction Process Sub-Module]

Input data process: Get_Mode 12: extract attribute values A0 to A2

Attribute value input process: In_Mode 32: execute an image process based on the red-eye correction attribute value A1

Attribute value output process: Out_Mode 40: not update attribute values

Output data process: Put_Mode 22: set and output the attribute values A0 to A2 (in combination with red-eye correction output pixel values)

[Noise Reduction Process Sub-Module] Input data process: Get_Mode 12: extract attribute values A0 to A2

Attribute value input process: In_Mode 33: execute an image process based on the noise reduction attribute value A2

Attribute value output process: Out_Mode 40: not update attribute values

Output data process: Put_Mode 22: set and output the attribute values A0 to A2 (in combination with noise reduction output pixel values)

Second Embodiment

A case will be described below as a use case different from the above case with reference to FIG. 9 wherein a noise reduction is executed for pixel values R, G, and B while independently switching degrees of blurring. Assume that processing image data uses a format 302 (three attribute value fields) shown in FIG. 4.

Assume that the relationship between the sub-modules and correction processes is as follows. Backlight correction process sub-module 11-1: not operate Red-eye correction process sub-module 11-2: not operate Noise reduction process sub-module 11-3: a noise reduction process (a smoothing process using a two-dimensional planar filter: R correction=OFF when an attribute value A0=0, R correction=ON when the attribute value A0=1; G correction=OFF when an attribute value A1=0, G correction=ON when the attribute value A1=1; B correction=OFF when an attribute value A2=0, B correction=ON when the attribute value A2=1)

Since the sequence of the process is the same as that shown in FIG. 8 described above, a difference will be described below. As a difference, the process starts from step S103. In the process in step S104, attribute values are set for respective pixels as follows according to the detection results in the process in step S103.

Attribute value field A0: a noise reduction attribute value R (0: R correction=OFF, 1: R correction=ON)

Attribute value field A1: a noise reduction attribute value G (0: G correction=OFF, 1: G correction=ON)

Attribute value field A2: a noise reduction attribute value B (0: B correction=OFF, 1: B correction=ON)

Figure 9:
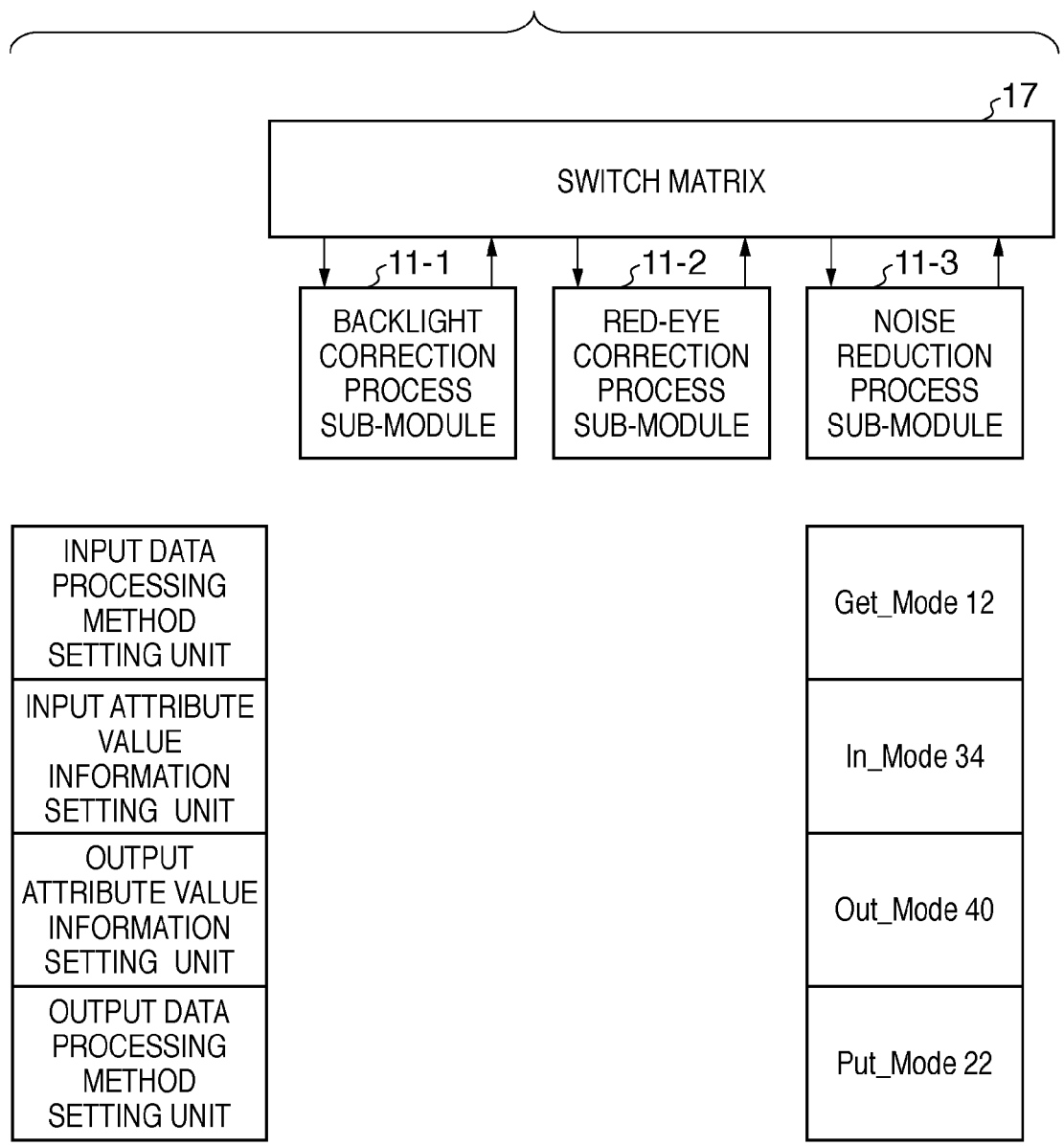
FIG. 9 is a schematic block diagram for explaining the second embodiment.

In the setting process in step S105, the contents shown in the lower portion of FIG. 9 are set as the information associated with the sub-modules 11-1 to 11-3. In addition, in the process in step S105, settings of two-dimensional filter coefficients used in the sub-module (noise reduction process sub-module) 11-3 and non-use settings of the sub-modules 11-1 and 11-2 are made. Furthermore, in the activation process in step S106, the sub-module 11-3 executes various image processes using attribute values according to the following settings.

[Noise Reduction Process Sub-Module]

Input data process: Get_Mode 12: extract attribute values A0 to A2

Attribute value input process: In_Mode 34: execute an image process based on the attribute values A0 to A2

Attribute value output process: Out_Mode 40: not update attribute values

Output data process: Put_Mode 22: set and output the attribute values A0 to A2 (in combination with noise reduction output pixel values)

With the above arrangement, only the noise reduction process sub-module 11-3 executes the image process based on all attribute values of the attribute value fields. At this time, other sub-modules 11-1 and 11-2 do not execute any image process (they do not use attribute values). As a matter of course, in this case, the backlight correction process sub-module 11-1 and red-eye correction process sub-module 11-2 may be controlled to execute static image processes without using any attribute values.

Note that upon execution of the noise reduction process, whether or not to apply a correction to respective R, G, and B channels is judged. In this case, the user may instruct as to whether or not to apply a correction. Alternatively, whether or not to apply a correction may be automatically decided based on an image analysis result. Such automatic decision may be made based on the process results in steps S101 and S102 shown in, for example, FIG. 8. More specifically, when it is judged that necessities of the backlight correction and red-eye correction are low, the noise reduction can be executed for the respective R, G, and B channels. That is, when the number of correction processes to be corrected by a series of processes in the single image processing module 4 is large, all the channels (RGB) may be corrected using one attribute value per correction. When the number of correction processes to be corrected by a series of processes in the single image processing module 4 is small, respective channels may be corrected more precisely using respective attribute values. As an example of a case in which the number of correction processes to be corrected by a series of processes in the single image processing module 4 is large, three correction processes, that is, a backlight correction, red-eye correction, and noise reduction are to be executed. In this case, upon execution of the backlight correction, all the channels (RGB) are corrected using one attribute value A0. Upon execution of the red-eye correction, all the channels (RGB) are corrected using one attribute value A1. Upon execution of the noise reduction, all the channels (RGB) are corrected using one attribute value A2. On the other hand, as an example of a case in which the number of correction processes to be corrected by a series of processes in the single image processing module 4 is small, only the noise reduction is to be executed. In this case, an R channel is corrected using the attribute value A0, a G channel is corrected using the attribute value A1, and a B channel is corrected using the attribute value A2, thus attaining more precise correction.

Third Embodiment

Figure 10:
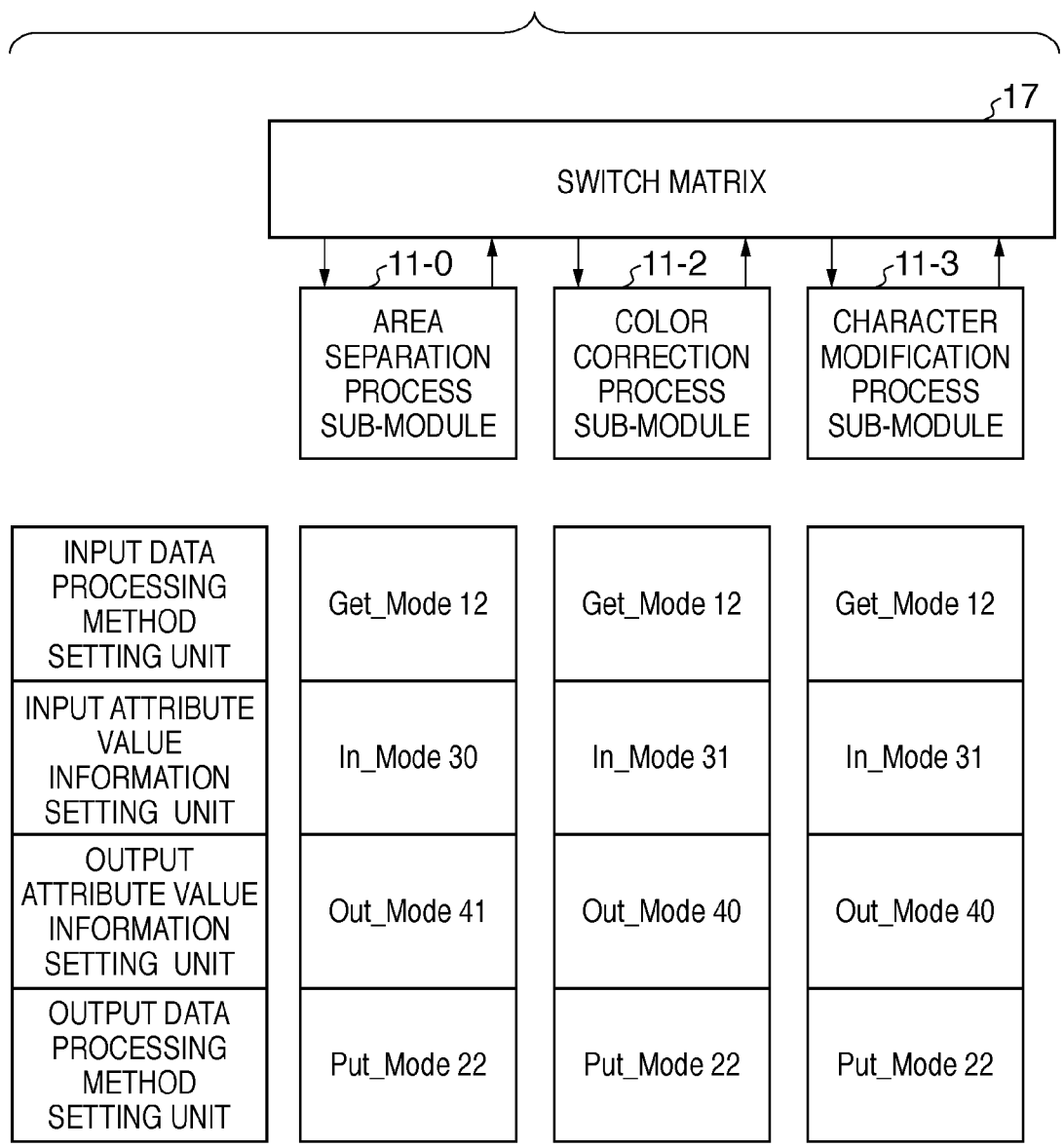
FIG. 10 is a schematic block diagram for explaining the third embodiment.

A case will be described below as a use case different from the aforementioned cases with reference to FIG. 10 wherein a text area and photo area are separated at the time of a copy operation, a color correction process for a photo is applied to the photo area, and a character modification process is applied to the text area. Assume that processing image data uses a format 302 (three attribute value fields) shown in FIG. 4.

Processes to be executed by respective sub-modules will be described first. An area separation is a process for determining a text area and photo area (for example, a process for determining these areas using a local density change upon comparison with thresholds). The color correction is a process for applying a color correction suited to a photo (for example, a color conversion using a three-dimensional lookup table), and a correction process has to be applied to only a photo area. The character modification is a process for sharpening characters (for example, an edge emphasis process using a two-dimensional planar filter), and a correction process has to be applied to only a text area. Note that these correction processes may be implemented by arbitrary methods.

Assume that the relationship between the sub-modules and correction processes is as follows. Area separation process sub-module 11-0: an area separation process (a comparison process between a pixel value of a pixel of interest and those of surrounding pixels around the pixel of interest: set an attribute value=0 for a text area; set an attribute value=1 for a photo area)

Color correction process sub-module 11-2: a color correction process (a color conversion process using a three-dimensional lookup table: correction=OFF when an attribute value=0; correction=ON when an attribute value=1)

Character modification process sub-module 11-3: a character modification process (a smoothing process using a two-dimensional planar filter: correction=ON when an attribute value=0; correction=OFF when an attribute value=1)

In this embodiment, reference numeral 11-0 is used to denote the area separation process sub-module. This reference numeral is assigned to clearly specify that this sub-module performs the area separation process different from the correction process executed by the backlight correction process sub-module 11-1 shown in FIGS. 7 and 8, for the sake of convenience. That is, the area separation process sub-module 11-0 corresponds to the sub-module 11-1 shown in FIG. 3.

Note that the color correction process sub-module and the aforementioned red-eye correction process sub-module can be implemented by the same sub-module, and the character modification process sub-module and the aforementioned noise reduction process sub-module can be implemented by the same module, although they have different names. However, parameters and attribute values have to be changed and set. That is, the single sub-module can execute different image processes in a photo printing operation and copy operation.

Since the sequence of the process is the same as that shown in FIG. 8 described above, a difference will be described below. As a difference, the process starts from step S105. In the setting process in step S105, the contents shown in the lower portion of FIG. 10 are set as the information associated with the sub-modules 11-0, 11-2, and 11-3. In addition, in the process in step S105, settings of a three-dimensional lookup table and two-dimensional filter coefficients used in the sub-modules 11-2 and 11-3 are made. Furthermore, in the activation process in step S106, the respective sub-modules execute various image processes using attribute values according to the following settings.

[Area Separation Process Sub-Module]

Input data process: Get_Mode 12: extract attribute values A0 to A2

Attribute value input process: In_Mode 30: not use any attribute values

Attribute value output process: Out_Mode 41: update an area separation attribute value A0

Output data process: Put_Mode 22: set and output attribute values A0 to A2 (in combination with area separation output pixel values)

[Color Correction Process Sub-Module]

Input data process: Get_Mode 12: extract attribute values A0 to A2

Attribute value input process: In_Mode 31: execute an image process based on the area separation attribute value A0

Attribute value output process: Out_Mode 40: not update attribute values

Output data process: Put_Mode 22: set and output the attribute values A0 to A2 (in combination with color correction output pixel values)

[Character Modification Process Sub-Module]

Input data process: Get_Mode 12: extract attribute values A0 to A2

Attribute value input process: In_Mode 31: execute an image process based on the area separation attribute value A0

Attribute value output process: Out_Mode 40: not update attribute values

Output data process: Put_Mode 22: set and output the attribute values A0 to A2 (in combination with character modification output pixel values)

With the aforementioned arrangement, the attribute value in a single attribute value field can be shared and used by the plurality of sub-modules. For this reason, attribute values can be effectively used. For example, sub-modules, which are not shown in FIG. 10, can execute processes based on attribute value fields (for example, fields A1 and A2), which are not used by the sub-modules shown in FIG. 10. Of course, the area separation process sub-module 11-0 may set the attribute value fields A0 and A1, and the remaining sub-modules 11-2 and 11-3 may execute the image processes using the set attribute values.

Since the assignment method, use method, and setting method of the attribute value fields in the processing image data can be set for respective sub-modules, flexible image processes can be executed while suppressing the number of attribute values for the whole system.

Fourth Embodiment

Figure 11:
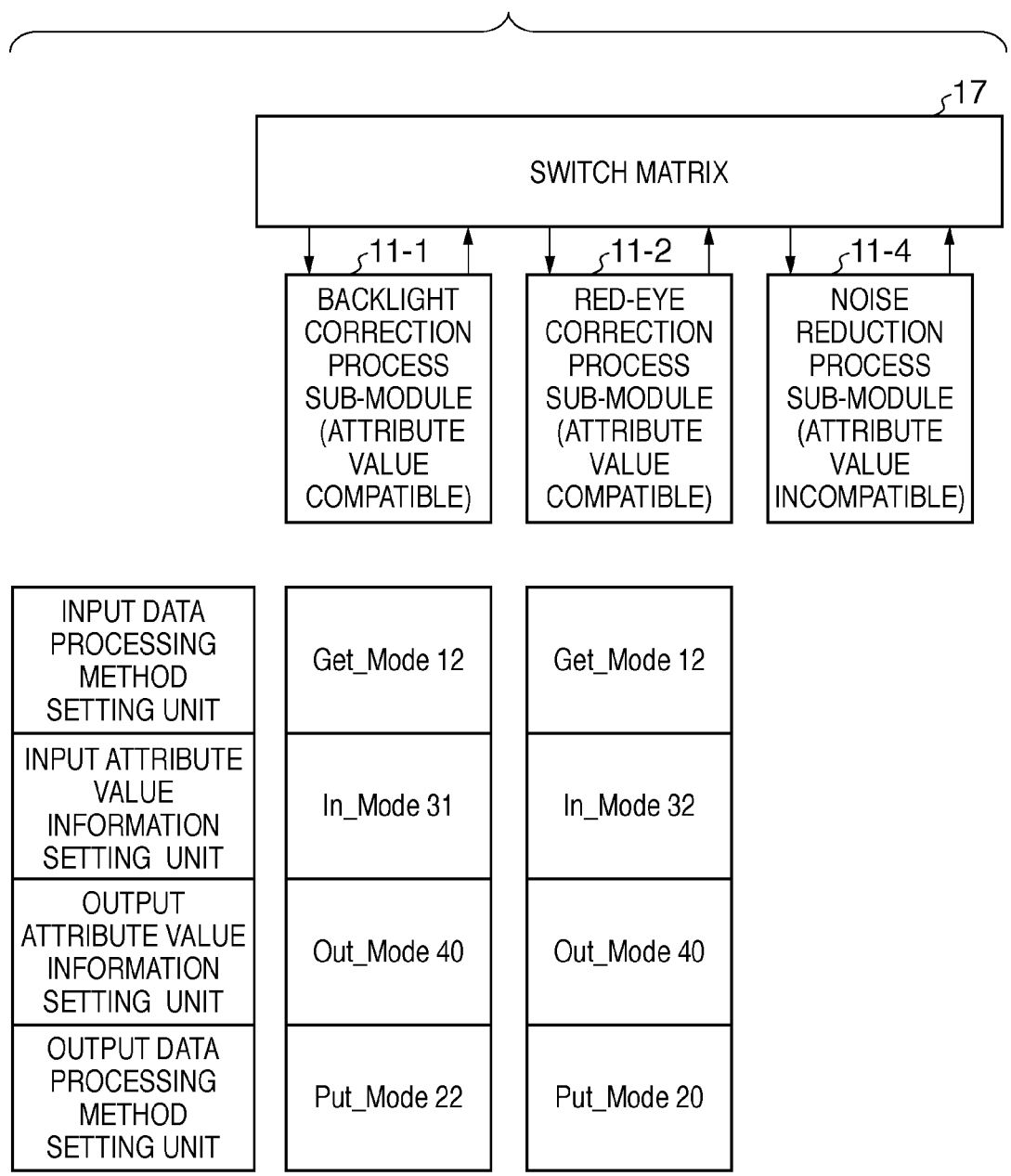
FIG. 11 is a schematic block diagram for explaining the fourth embodiment.

A case will be described below wherein both attribute value compatible sub-modules and an attribute value incompatible sub-module are included. FIG. 11 illustrates two attribute value compatible sub-modules and one attribute value incompatible sub-module. A case will be described below wherein the two attribute value compatible sub-modules execute image processes using externally transferred attribute values, and the attribute value incompatible sub-module then executes an image process.

The respective sub-modules execute processes using a format 302 (three attribute value fields) shown in FIG. 4. However, a noise reduction process sub-module 11-4 as the attribute value incompatible sub-module receives data having a format 301 shown in FIG. 4 after an attribute value removal process is executed.

Assume that the relationship between the sub-modules and correction processes is as follows.

Backlight correction process sub-module 11-1: a backlight correction process (a tone conversion process using a linear lookup table: correction=OFF when an attribute value=0; correction=ON when an attribute value=1)

Red-eye correction process sub-module 11-2: a red-eye correction process (a color conversion process using a three-dimensional lookup table: correction=OFF when an attribute value=0; correction=ON when an attribute value=1)

Noise reduction process sub-module 11-4: a noise reduction process (a smoothing process using a two-dimensional planar filter: evenly apply a process to all pixels using the same filter coefficients)

Since the sequence of the processes is the same as that in FIG. 8 described above, a difference will be described below. As a difference, after the process in step S102, the process advances to step S104 while skipping the process in step S103. The setting contents of attribute values in the process in step S104 are as follows. These attribute values are set for respective pixels according to the detection results of the processes in steps S101 and S102 described above.

Attribute value field A0: a backlight correction attribute value (0: correction=OFF, 1: correction=ON)

Attribute value field A1: a red-eye correction attribute value (0: correction=OFF, 1: correction=ON)

Attribute value field A2: not set

In the setting process in step S105, the contents shown in the lower portion of FIG. 11 are set as the information associated with the sub-modules 11-1, 11-2, and 11-4. In addition, in the process in step S105, settings of linear and three-dimensional lookup tables and two-dimensional filter coefficients used in the sub-modules 11-2 and 11-3 are made. Furthermore, in the activation process in step S106, the respective sub-modules execute various image processes using attribute values according to the following settings.

[Backlight Correction Process Sub-Module]

Input data process: Get_Mode 12: extract attribute values A0 to A2

Attribute value input process: In_Mode 31: execute an image process based on the backlight correction attribute value A0

Attribute value output process: Out_Mode 40: not update attribute values

Output data process: Put_Mode 22: combine the attribute values A0 to A2 with backlight correction output pixel values

[Red-Eye Correction Process Sub-Module]

Input data process: Get_Mode 128 bits: extract attribute values A0 to A2

Attribute value input process: In_Mode 32: execute an image process based on the red-eye correction attribute value A1

Attribute value output process: Out_Mode 40: not update attribute values

Output data process: Put_Mode 20: output red-eye correction output pixel values without using any attribute values while expanding respective channels (32 bits)

[Noise Reduction Process Sub-Module]

Static image process: input 32-bit pixel values of R, G, and B channels, evenly apply a filter process to an entire image, and then output 32-bit filter output pixel values of the R, G, and B channels The reason why the red-eye correction process sub-module 11-2 expands respective channels to 32 bits without using any attribute values is to adapt to the input format of the noise reduction process sub-module 11-4 as the attribute value incompatible sub-module. In the description of this embodiment, the attribute value incompatible sub-module 11-4 as the noise reduction sub-module processes the format 301 shown in FIG. 4 (32 bits for each of the R, G, and B channels). However, the present invention is not limited to this. For example, when the input format of the noise reduction process sub-module 11-4 as the attribute value incompatible sub-module includes 24-bit fields for respective channels, the red-eye correction process sub-module executes the output data process in "Put_Mode 21". That is, this sub-module sets all "0"s in 8-bit attribute value fields. Furthermore, when the input format of the noise reduction process sub-module 11-4 as the attribute value incompatible sub-module includes 16-bit fields for respective channels, the red-eye correction process sub-module executes the output data process in "Put_Mode 23". That is, this sub-module sets all "0"s in 16-bit attribute value fields. In this embodiment, processing image data that has undergone the noise reduction by the attribute value incompatible sub-module 11-4 is output to the write buffer 12, but the attribute value incompatible sub-module 11-4 does not have any function of rewriting attribute value fields. For this reason, the process in the red-eye correction process sub-module is executed to erase the attribute values in the attribute value fields before processing image data is input to the attribute value incompatible sub-module 11-4, when attribute values used in an image processing module 4 of this embodiment need not be output outside the image processing module 4.

With the aforementioned arrangement, the attribute value compatible sub-module, which executes the process immediately before the attribute value incompatible sub-module, sets all "0"s in attribute values. Hence, the attribute value incompatible sub-module need not have any function of rewriting attribute values, and the circuit arrangement of the image processing module 4 can be simplified. Then, even when the image processing module 4 includes both the attribute value compatible sub-modules and attribute value incompatible sub-module, image processes can be executed without posing any problem.

Fifth Embodiment

A case will be described below with reference to FIG. 12 wherein both attribute value compatible sub-modules and an attribute value incompatible sub-module are included, and an attribute value transfer wrapper layer 110 is further arranged. In this embodiment, a case will be described wherein after an image process in an attribute value incompatible sub-module, two attribute value compatible sub-modules execute image processes using externally transferred attribute values.

Note that respective sub-modules execute processes using a format 302 (three attribute value fields) shown in FIG. 4. However, a backlight correction process sub-module 11-5 as an attribute value incompatible sub-module receives data having a format 301 shown in FIG. 4 since the attribute value transfer wrapper layer 110 is arranged.

Assume that the relationship between the sub-modules and correction processes is as follows. Backlight correction process sub-module 11-5: a backlight correction process (a tone conversion process using a linear lookup table: evenly apply the same process to all pixels)

Red-eye correction process sub-module 11-2: a red-eye correction process (a color conversion process using a three-dimensional lookup table: correction=OFF when an attribute value=0; correction=ON when an attribute value=1)

Noise reduction process sub-module 11-3: a noise reduction process (a smoothing process using a two-dimensional planar filter: correction=OFF when an attribute value=0; correction=ON when an attribute value=1)

Since the sequence of the process is the same as that shown in FIG. 8 described above, a difference will be described below. As a difference, the process starts from step S102. In the process in step S104, attribute values are set for respective pixels as follows according to the detection results in the processes in steps S102 and S103.

Attribute value field A0: not set

Attribute value field A1: a red-eye correction attribute value (0: correction=OFF, 1: correction=ON)

Attribute value field A2: a noise reduction attribute value (0: correction=OFF, 1: correction=ON)

Figure 12:
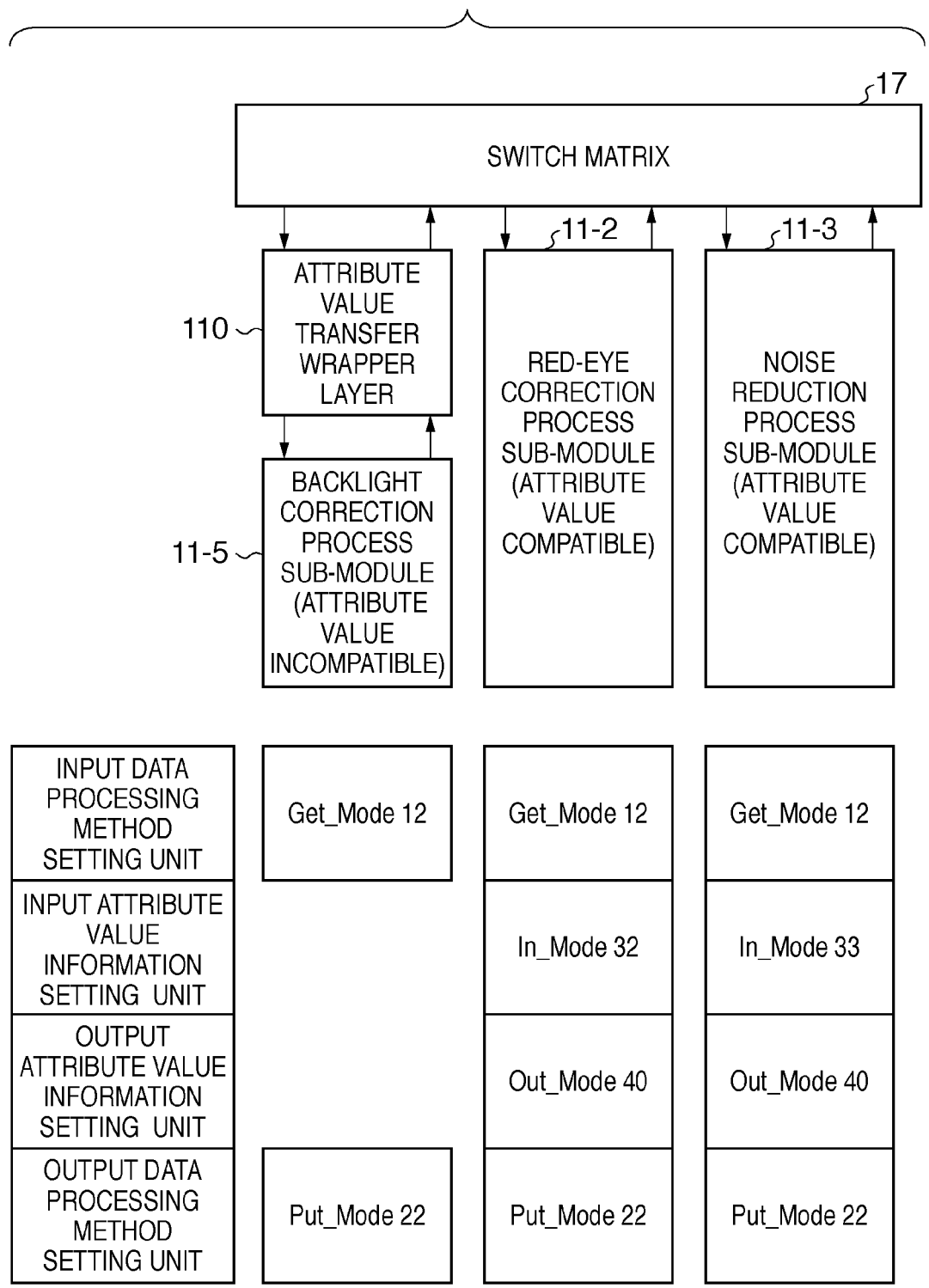
FIG. 12 is a schematic block diagram for explaining the fifth embodiment.

In the setting process in step S105, the contents shown in the lower portion of FIG. 12 are set as the information associated with the sub-modules 11-2 and 11-3, and the attribute value transfer wrapper layer 110. In addition, in the process in step S105, settings of linear and three-dimensional lookup tables and two-dimensional filter coefficients used in the sub-modules 11-2 and 11-3 and the attribute value transfer wrapper layer 110 are made. Furthermore, in the activation process in step S106, the respective sub-modules execute various image processes using attribute values according to the following settings.

[Attribute Value Transfer Wrapper Layer 110]

Input data process: Get_Mode 12: extract attribute values A0 to A2

Output data process: Put_Mode 22: set and output attribute values A0 to A2 (in combination with backlight correction output pixel values)

[Red-Eye Correction Process Sub-Module]

Input data process: Get_Mode 12: extract attribute values A0 to A2

Attribute value input process: In_Mode 32: execute an image process based on the red-eye correction attribute value A1

Attribute value output process: Out_Mode 40: not update attribute values

Output data process: Put_Mode 22: set and output the attribute values A0 to A2 (in combination with red-eye correction output pixel values)

[Noise Reduction Process Sub-Module]

Input data process: Get_Mode 12: extract attribute values A0 to A2

Attribute value input process: In_Mode 33: execute an image process based on the noise reduction attribute value A2

Attribute value output process: Out_Mode 40: not update attribute values

Output data process: Put_Mode 22: set and output the attribute values A0 to A2 (in combination with noise reduction output pixel values)

With the aforementioned arrangement, since the attribute value transfer wrapper layer 110 is arranged, even when an image processing module 4 includes both the attribute value compatible sub-modules and attribute value incompatible sub-module, the image processes can be executed without posing any problem.

Since the assignment method, use method, and setting method of the attribute value fields in the processing image data can be set for respective sub-modules, flexible image processes can be executed while suppressing the number of attribute values for the whole system. Furthermore, attribute value compatible sub-modules can be arranged together with an existing attribute value incompatible sub-module.

Sixth Embodiment

A case will be described below wherein respective sub-modules execute processes using a format 303 (six attribute value fields) shown in FIG. 4.

Information set by an input attribute value information setting unit 409 will be explained using "Table 5". A second attribute value management unit 411 executes various processes based on the information in this "Table 5" prior to the beginning of an image process. Note that the setting values shown in "Table 5" are merely examples, and the present invention is not limited to these specific values. In this embodiment, a field A0 corresponds to an attribute value field 3034 in the format 303 shown in FIG. 4, a field A1 corresponds to an attribute value field 3035 in the format 303 shown in FIG. 4, and a field A2 corresponds to an attribute value field 3036 in the format 303 shown in FIG. 4. Also, a field A3 corresponds to an attribute value field 3037 in the format 303 shown in FIG. 4, a field A4 corresponds to an attribute value field 3038 in the format 303 shown in FIG. 4, and a field A5 corresponds to an attribute value field 3039 in the format 303 shown in FIG. 4.

TABLE 5

| Input attribute value | Attribute values (A0/A1/A2/A3/A4/A5) used for respective pixel values | | |
|---|---|---|---|
| information setting | For pixel value R | For pixel value G | For pixel value B |
| In_Mode 50 | | Not use | |
| In_Mode 51 | | Use A0 | |
| In_Mode 52 | | Use A1 | |
| In_Mode 53 | | Use A2 | |
| In_Mode 54 | | Use A3 | |
| In_Mode 55 | | Use A4 | |
| In_Mode 56 | | Use A5 | |
| In_Mode 57 | Use A0 | Use A2 | Use A4 |
| In_Mode 58 | Use A1 | Use A3 | Use A5 |

[In_Mode 50]

This setting does not use any attribute values in an image process. That is, the second attribute value management unit 411 does not input any attribute values to an image processing unit 413. In this case, a sub-module serves as an attribute value incompatible sub-module.

[In_Mode 51 to In_Mode 56]

This setting is suited when an adaptive image process is executed for all pixel value fields (3 channels) using one attribute value field (A0 for In_Mode 51 to A5 for In_Mode 56) of the plurality of attribute value fields (A0 to A5). When one of "In_Mode 51" to "In_Mode 56" is set, the image process is executed without using other attribute value fields.

[In_Mode 57]

This setting is suited when an adaptive image process is executed using the attribute value field A0 for a pixel value R, the attribute value field A2 for a pixel value G, and the attribute value field A4 for a pixel value B of the plurality of attribute value fields (A0 to A5). When "In_Mode 57" is set, the image process is executed without using the remaining attribute value fields (A1, A3, A5).

[In_Mode 58]

This setting is suited when an adaptive image process is executed using the attribute value field A1 for a pixel value R, the attribute value field A3 for a pixel value G, and the attribute value field A5 for a pixel value B of the plurality of attribute value fields (A0 to A5). When "In_Mode 58" is set, the image process is executed without using the remaining attribute value fields (A0, A2, A4).

As described above, when the process is executed by selectively using "In_Mode 50" to "In_Mode 58", an adaptive image process can be executed using information of at least one of the plurality of attribute value fields. For example, use examples to be described below are available.

1) Six sub-modules execute RGB-common image processes respectively using different attribute values.

2) Two sub-modules execute RGB-dependent image processes respectively using three attribute values.

3) Three sub-modules execute RGB-common image processes respectively using different attribute values, and one sub-module execute RGB-dependent image processes using three attribute values.

Information set by an output attribute value information setting unit 410 will be described below using "Table 6". The second attribute value management unit 411 executes various processes based on the information of this "Table 6" after completion of the image process. Note that the setting values shown in this "Table 6" are merely examples, and the present invention is not limited to these specific values.

TABLE 6

| Output attribute value information setting | Setting Method of respective attribute values (A0/A1/A2/A3/A4/A5) | | | | | |
|---|---|---|---|---|---|---|
| | Attribute value A0 | Attribute value A1 | Attribute value A2 | Attribute value A3 | Attribute value A4 | Attribute value A5 |
| Out Mode 60 | | | | * | | |
| Out Mode 61 | Set | | | * | | |
| Out Mode 62 | * | Set | | | * | |
| Out Mode 63 | | * | Set | | | * |
| Out Mode 64 | | * | | Set | | * |
| Out Mode 65 | | | * | | Set | * |
| Out Mode 66 | | | * | | | Set |
| Out Mode 67 | Set | * | Set | * | Set | * |
| Out Mode 68 | * | Set | * | Set | * | Set |

*An input attribute value is used as an output attribute value

[Out_Mode 60]

This setting is suited when a self module (sub-module of interest) does not set any attribute values. That is, output attribute values use input attribute values intact, and they assume the same values.

[Out_Mode 61 to Out_Mode 66]

This setting is suited when only one attribute value field (A0 for Out_Mode 61 to A5 for Out_Mode 66) of the plurality of attribute value fields (A0 to A5) is newly set. When one of "Out_Mode 61" to "Out_Mode 66" is set, other attribute value fields are not updated.

[Out_Mode 67]

This setting is suited when only the attribute value fields A0, A2, and A4 of the plurality of attribute value fields (A0 to A5) are newly set. When "Out_Mode 67" is set, other attribute value fields (A1, A3, A5) are not updated.

[Out_Mode 68]

This setting is suited when only the attribute value fields A1, A3, and A5 of the plurality of attribute value fields (A0 to A5) are newly set. When "Out_Mode 68" is set, other attribute value fields (A0, A2, A4) are not updated.

As described above, when the process is executed by selectively using "Out_Mode 60" to "Out_Mode 68", the setting of information of at least one of the plurality of attribute value fields can be changed. For example, the following use examples are available:

1) a case in which six sub-modules respectively set different attribute values;

2) a case in which two sub-modules respectively set three attribute values; and 3) a case in which three sub-modules respectively set different attribute values, and one sub-module sets three attribute values.

When the number of attribute value fields is increased in this way, the flexibility of image processes can be further enhanced. Even when the number of attribute value fields is increased, the data size (96 bits) of processing image data remains unchanged. For this reason, the system can be designed to balance the number of Bits (tonality of an image) to be assigned as a pixel value and the number of Bits (flexibility of an adaptive image process) to be assigned to an attribute value without largely changing the scale of the whole system.

Seventh Embodiment

A case will be described below wherein respective sub-modules execute processes using a format 305 (four attribute value fields) shown in FIG. 4. In this embodiment, a field A0 corresponds to an attribute value field 3054 in the format 305 shown in FIG. 4, and a field A1 corresponds to an attribute value field 3055 in the format 305 shown in FIG. 4. Also, a field A2 corresponds to an attribute value field 3056 in the format 305 shown in FIG. 4, and a field A3 corresponds to an attribute value field 3057 in the format 305 shown in FIG. 4. In the format 305, as described above, the attribute value fields A0 and A1 are configured to have a 16-bit width, while the attribute value fields A2 and A3 are configured to have an 8-bit width. The attribute value fields A2 and A3 can be handled as a continuous attribute value field having a 16-bit width, or different 8-bit attribute value fields. Furthermore, the attribute value fields A0 and A2, and the attribute value fields A1 and A3 can be handled as attribute value fields having a 24-bit width.

With this configuration, the number of attribute values (the number of types of adaptive image processes) and the number of Bits of each attribute value (precision of an adaptive image process) can be balanced while fixing the format of processing image data, thus allowing more flexible image processes.

Information set by an input attribute value information setting unit 409 will be explained using "Table 7". A second attribute value management unit 411 executes various processes based on the information in this "Table 7" prior to the beginning of an image process. Note that the setting values shown in "Table 7" are merely examples, and the present invention is not limited to these specific values.

TABLE 7

| Input attribute value information setting | Attribute values (A0/A1/A2/A3) used for respective pixel values | | |
|---|---|---|---|
| | For pixel value R | For pixel value G | For pixel value B |
| In_Mode 70 | | Not use | |
| In_Mode 71 | | Use A0 | |
| In_Mode 72 | | Use A1 | |
| In_Mode 73 | | Use A2 and A3 | |
| In_Mode 74 | Use A0 | Use A1 | Use A2 and A3 |
| In_Mode 75 | | Use A0 and A2 | |
| In_Mode 76 | | Use A1 and A3 | |
| In_Mode 77 | | Use A2 | |
| In_Mode 78 | | Use A3 | |

[In_Mode 70]

This setting does not use any attribute values in an image process. That is, the second attribute value management unit 411 does not input any attribute values to an image processing unit 413. In this case, a sub-module serves as an attribute value incompatible sub-module.

[In_Mode 71]

This setting is suited when an adaptive image process is executed for all pixel value fields (3 channels) using only the attribute value field A0 of the plurality of attribute value fields (A0 to A3). When "In_Mode 71" is set, the image process is executed without using other attribute value fields (A1, A2, A3).

[In_Mode 72]

This setting is suited when an adaptive image process is executed for all pixel value fields (3 channels) using only the attribute value field A1 of the plurality of attribute value fields (A0 to A3). When "In_Mode 72" is set, the image process is executed without using other attribute value fields (A0, A2, A3).

[In_Mode 73]

This setting is suited when an adaptive image process is executed for all pixel value fields (3 channels) using the attribute value fields A2 and A3 of the plurality of attribute value fields (A0 to A3) as one attribute value field (16 bits). When "In_Mode 73" is set, the image process is executed without using other attribute value fields (A0, A1).

[In_Mode 74]

This setting uses, of the plurality of attribute value fields (A0 to A3), the attribute value field A0 for a pixel value R, the attribute value field A1 for a pixel value G, and the attribute value fields A2 and A3 as one attribute value field (16 bits) for a pixel value B. This setting is suited when an adaptive image process is executed using the attribute value fields in such way.

[In_Mode 75]

This setting is suited when an adaptive image process is executed for all pixel value fields (3 channels) using the attribute value fields A0 and A2 of the plurality of attribute value fields (A0 to A3) as one attribute value field (24 bits). When "In_Mode 75" is set, the image process is executed without using other attribute value fields (A1, A3).

[In_Mode 76]

This setting is suited when an adaptive image process is executed for all pixel value fields (3 channels) using the attribute value fields A1 and A3 of the plurality of attribute value fields (A0 to A3) as one attribute value field (24 bits). When "In_Mode 76" is set, the image process is executed without using other attribute value fields (A0, A2).

[In_Mode 77]

This setting is suited when an adaptive image process is executed for all pixel value fields (3 channels) using the attribute value field A2 of the plurality of attribute value fields (A0 to A3) as one attribute value field (8 bits). When "In_Mode 77" is set, the image process is executed without using other attribute value fields (A0, A1, A3).

[In_Mode 78]

This setting is suited when an adaptive image process is executed for all pixel value fields (3 channels) using the attribute value field A3 of the plurality of attribute value fields (A0 to A3) as one attribute value field (8 bits). When "In_Mode 78" is set, the image process is executed without using other attribute value fields (A0, A1, A2).

As described above, when the process is executed by selectively using "In_Mode 70" to "In_Mode 78", an adaptive image process can be executed using information of at least one of the plurality of attribute value fields.

Information set by an output attribute value information setting unit 410 will be described below using "Table 8". The second attribute value management unit 411 executes various processes based on the information of this "Table 8" after completion of the image process. Note that the setting values shown in this "Table 8" are merely examples, and the present invention is not limited to these specific values.

TABLE 8

| Output attribute value information setting | Setting method of respective attribute values (A0/A1/A2/A3) | | | |
| --- | --- | --- | --- | --- |
| | Attribute value A0 | Attribute value A1 | Attribute value A2 | Attribute value A3 |
| Out_Mode 80 | | * | | |
| Out_Mode 81 | Set | | * | |
| Out_Mode 82 | * | Set | | * |
| Out_Mode 83 | | * | | Set |
| Out_Mode 84 | | | Set | |
| Out_Mode 85 | Set | * | Set | * |
| Out_Mode 86 | * | Set | * | Set |
| Out_Mode 87 | | * | Set | * |
| Out_Mode 88 | | * | | Set |

\* An input attribute value is used as an output attribute value

[Out_Mode 80]

This setting is suited when a self module (sub-module of interest) does not set any attribute values. That is, output attribute values use input attribute values intact, and they assume the same values.

[Out_Mode 81]

This setting is suited when only the attribute value field A0 of the plurality of attribute value fields (A0 to A3) is newly set. When "Out_Mode 81" is set, other attribute value fields (A1, A2, A3) are not updated.

[Out_Mode 82]

This setting is suited when only the attribute value field A1 of the plurality of attribute value fields (A0 to A3) is newly set. When "Out_Mode 82" is set, other attribute value fields (A0, A2, A3) are not updated.

[Out_Mode 83]

This setting is suited when the attribute value fields A2 and A3 are handled as one attribute value field (16 bits), and that field is newly set. When "Out_Mode 83" is set, other attribute value fields (A0, A1) are not updated.

[Out_Mode 84]

This setting is suited when all of the plurality of attribute value fields (A0 to A3) are newly set. In this case, the attribute value fields A2 and A3 are handled as one attribute value field (16 bits).

[Out_Mode 85]

This setting is suited when the attribute value fields A0 and A2 are handled as one attribute value field (24 bits), and that field is newly set. When "Out_Mode 85" is set, other attribute value fields (A1, A3) are not updated.

[Out_Mode 86]

This setting is suited when the attribute value fields A1 and A3 are handled as one attribute value field (24 bits), and that field is newly set. When "Out_Mode 86" is set, other attribute value fields (A0, A2) are not updated.

[Out_Mode 87]

This setting is suited when only the attribute value field A2 of the plurality of attribute value fields (A0 to A3) is newly set. When "Out_Mode 87" is set, other attribute value fields (A0, A1, A3) are not updated.

[Out_Mode 88]

This setting is suited when only the attribute value field A3 of the plurality of attribute value fields (A0 to A3) is newly set. When "Out_Mode 88" is set, other attribute value fields (A0, A1, A2) are not updated.

As described above, when the process is executed by selectively using "Out_Mode 80" to "Out_Mode 88", an adaptive image process can be executed using information of at least one of a plurality of attribute value fields.

Eighth Embodiment

A case will be described below wherein a weighted average of image processing results by image processing sub-modules 11 is to be calculated. That is, in the eighth embodiment, a weighted average process is executed using attribute values.

An overview of the weighted average process according to the eighth embodiment will be described below with reference to FIG. 13.

A first image processing unit 1902 applies an image process (first image process) to an input pixel value 1900. A pixel value (first converted pixel value) 1901 after the image process is input to a second image processing unit 1903. The second image processing unit 1903 also receives an attribute value 1907 including information (for example, a coefficient α: 0 to 1) of the weighted average process, in addition to the first converted pixel value 1901.

The second image processing unit 1903 includes a weighted average processing unit 1905, information holding unit 1909, and output unit 1908. The weighted average processing unit 1905 calculates a weighted average of the first converted pixel value 1901 (a pixel value before an image process of the second image processing unit), and a pixel value (second converted pixel value) 1904 after the image process (second image process) of the second image processing unit 1903. This weighted average process is executed based on the information included in the attribute value 1907. As a result of the weighted average process, the weighted average processing unit 1905 outputs a weighted-averaged pixel value (a weighted-averaged pixel value) 1906 to the output unit 1908.

The output unit 1908 receives the second converted pixel value 1904 and weighted-averaged pixel value 1906. The output unit 1908 externally outputs, as an output pixel value 1910, one of these received pixel values based on information held in the information holding unit 1909 from the second image processing unit 1903. More specifically, when the information held in the information holding unit 1909 indicates weighted average execution=ON, the output unit 1908 externally outputs the weighted-averaged pixel value 1906 as the output pixel value 1910 from the second image processing unit 1903. When the information held in the information holding unit 1909 indicates weighted average execution=OFF, the output unit 1908 externally outputs the second converted pixel value 1904 as the output pixel value 1910 from the second image processing unit 1903. Note that the output unit 1908 may output both the second converted pixel value 1904 and weighted-averaged pixel value 1906. In the information holding unit 1909, information indicating ON/OFF of execution of the weighted average process is specified in addition to information associated with selection of the output pixel value. That is, the weighted average process by the weighted average processing unit 1905 is executed based on the information held in this information holding unit 1909.

An image processing module 4 according to this embodiment processes processing image data by sequentially moving it between sub-modules 11 using a switch matrix 17. For this purpose, identical processing image data is input to the plurality of sub-modules 11 at the same time to concurrently execute different image processes. Therefore, a conventional method cannot apply a weighted average process to the processing image data simultaneously output from the plurality of sub-modules 11. For example, a pixel value input to the second image processing unit 1903 according to this embodiment is not the input pixel value 1900 but the first converted pixel value 1901. For this reason, the second image processing unit 1903 calculates the input pixel value 1900 from the first converted pixel value 1901, and applies the second image process to the input pixel value 1900 generated by the internal calculation, thereby generating the second converted pixel value. FIG. 13 describes an inverse conversion block of the first image process and an image processing block used to execute a second conversion, which blocks are bounded by the dotted lines, so as to help easy understanding of the concept of the calculations executed in the second image processing unit 1903. However, circuits associated with these blocks need not always be independently arranged, and may be implemented by a circuit which executes a conversion that combines these conversions. Therefore, of the sub-modules 11 to which the weighted average processing unit 1905, output unit 1908, and information holding unit 1909 are added, the sub-module 11 having a circuit suited to the combined conversion can be assigned to the second image processing unit 1903. Note that the circuit that performs the combined conversion can execute, for example, a linear lookup table process, three-dimensional lookup table process, filter process, and matrix process. That is, the sub-module 11 to which the weighted average processing unit 1905, output unit 1908, and information processing unit 1909 are added is not a dedicated circuit which performs the weighted average process, but it can be used in other processes which do not include any weighted average process.

The output pixel value 1910 (weighted-averaged pixel value) is expressed by:

Output pixel value=first converted pixel value+α×
(second converted pixel value−first converted
pixel value)

where α is a coefficient (internal division ratio) of the weighted average process.

Figure 14A:
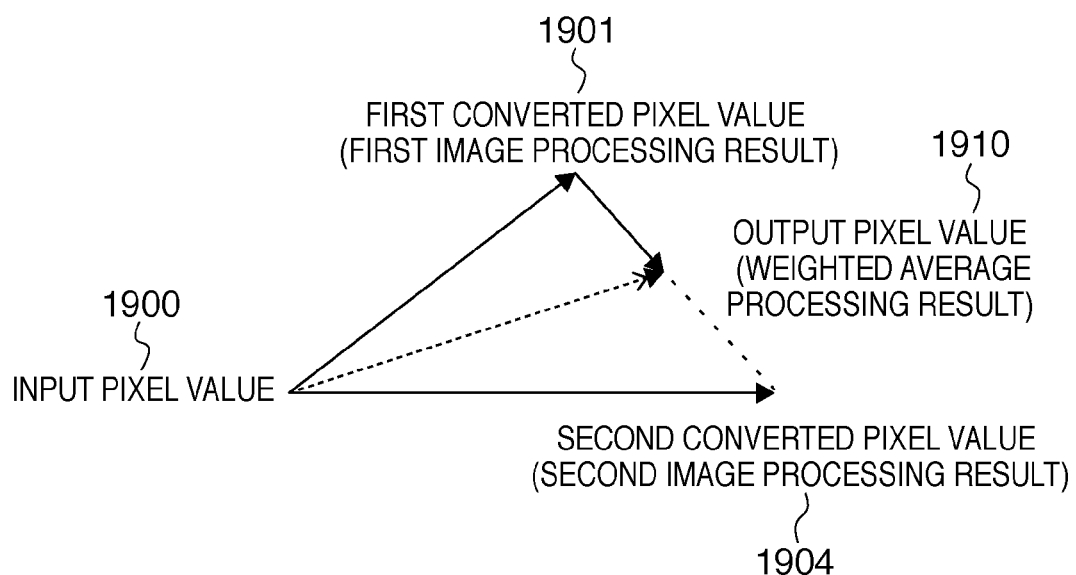
FIGS. 14A and 14B are views which express examples of the weighted average process result using a vector.
Figure 14B:
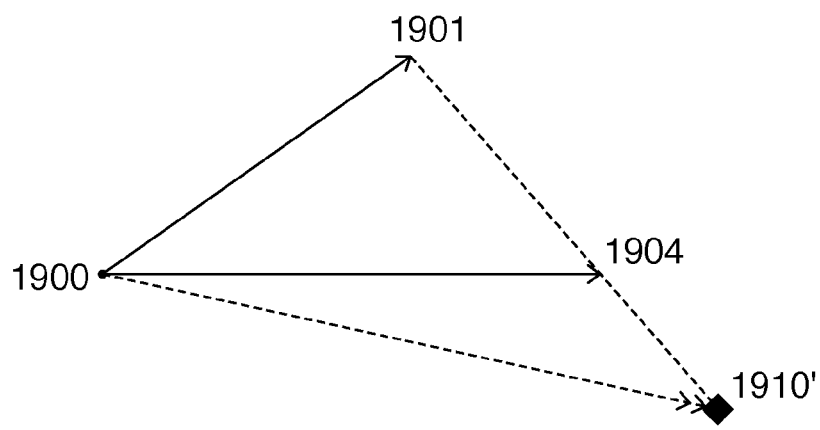

FIGS. 14A and 14B are views which express the weighted average process result using a vector when an input pixel value is used as a start point of a vector, and a converted pixel value is used as an end point of the vector. Based on the input pixel value 1900, (second converted pixel value 1904—first converted pixel value 1901) is multiplied by a, and that product is added to the first converted pixel value 1901. Thus, the output pixel value 1910 is calculated. Note that FIG. 14A expresses a case in which the pixel value 1910 internally divides the pixel values 1901 and 1904.

Also, the output pixel value 1910 (weighted-averaged pixel value) is also expressed by:

Output pixel value=second converted pixel value+
(1−α)×(first converted pixel value−second con-
verted pixel value)

Note that FIG. 14B expresses an output pixel value 1910' of a process which externally divides the pixel values 1901 and 1904 as another mode of the weighted average process. In case of the weighted average process which externally divides the pixel values, information corresponding to an external division ratio is set in the information holding unit 1909.

Figure 13:
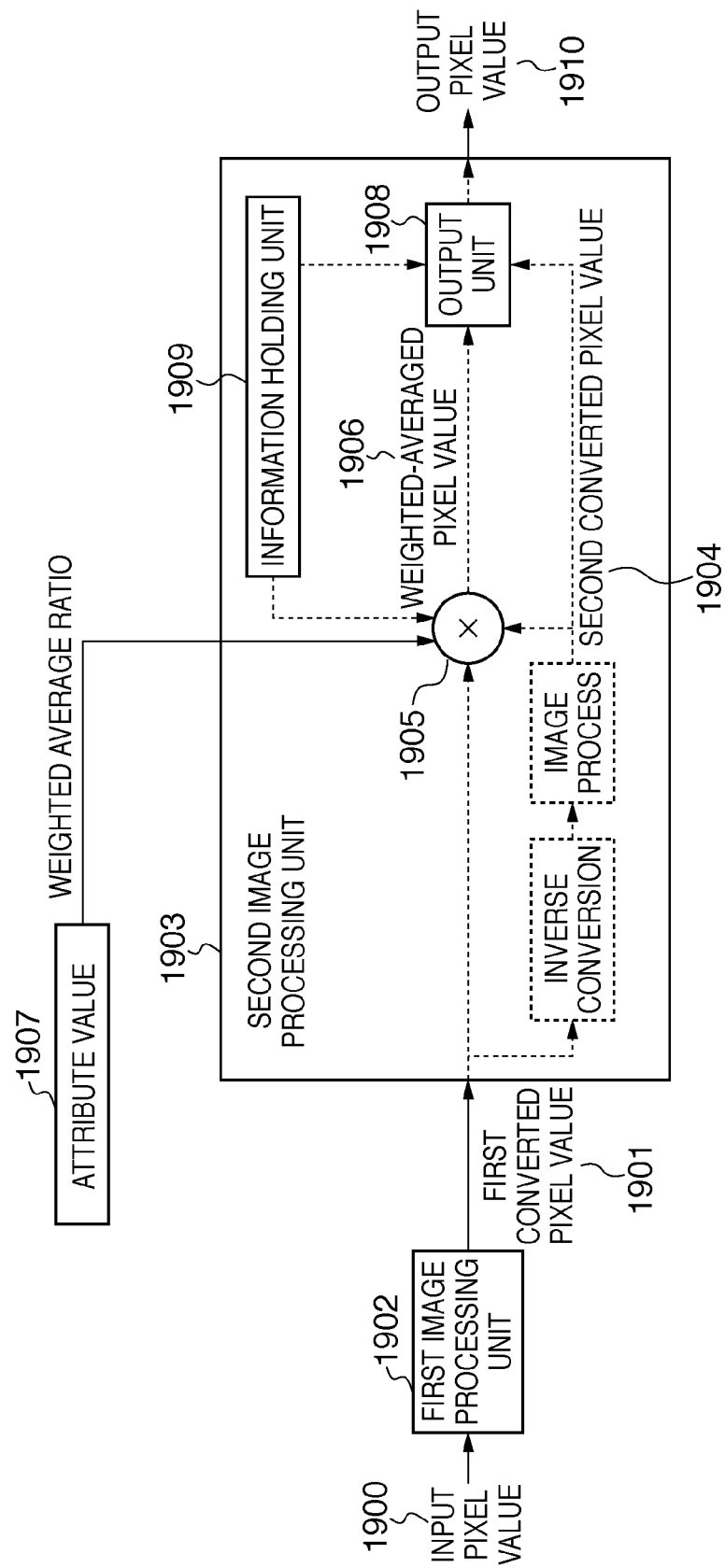
FIG. 13 is a schematic block diagram showing an example of the arrangement, which implements a weighted average process.
Figure 15:
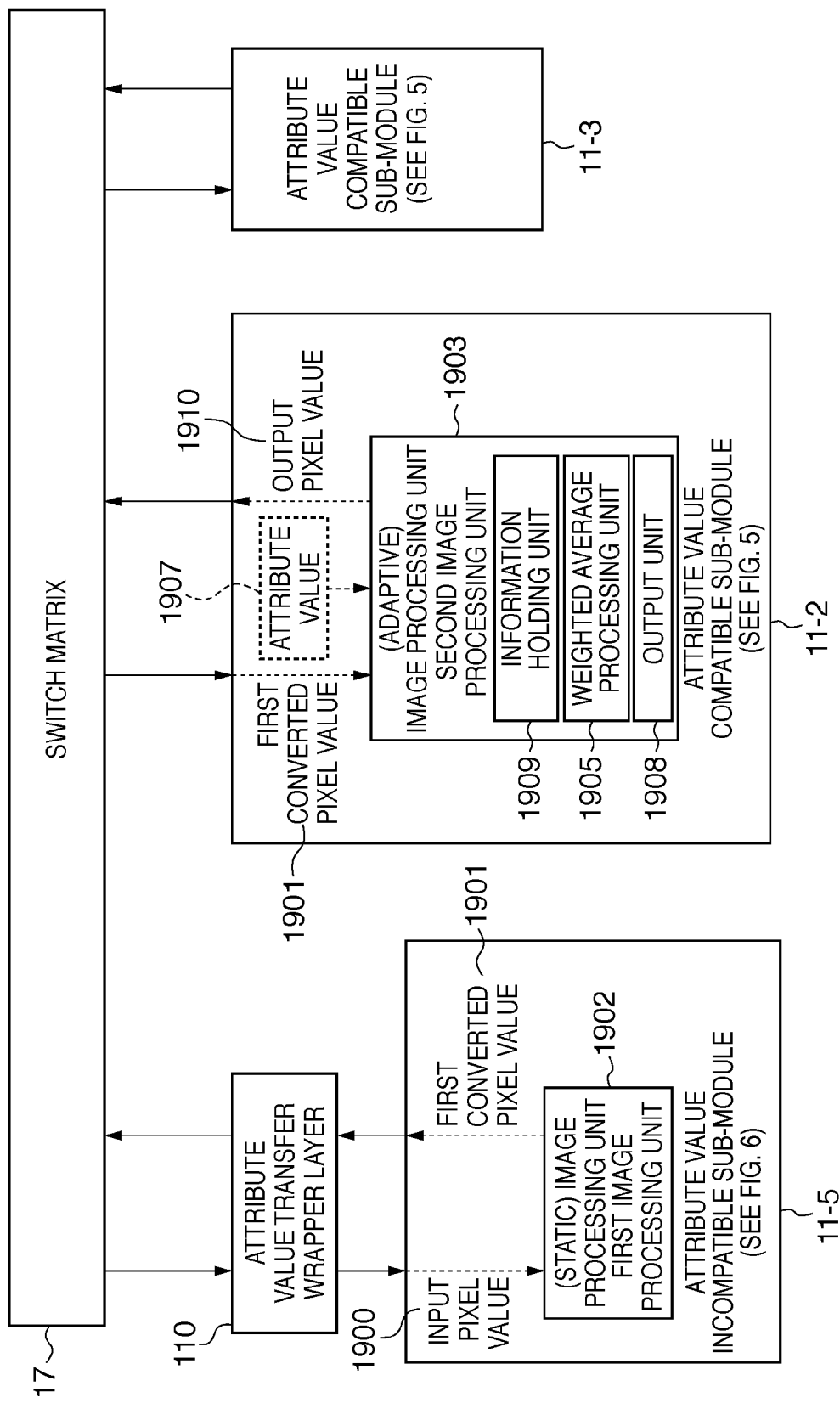
FIG. 15 is a schematic block diagram for explaining the eighth embodiment.

An example of a case in which the conceptual arrangement shown in FIG. 13 is applied to the image processing module 4 will be described below with reference to FIG. 15. A case will be exemplified wherein the arrangement shown in FIG. 13 is applied to the image processing module 4 (including both attribute value compatible sub-modules and an attribute value incompatible sub-module) shown in FIG. 12 described in the fifth embodiment. Note that FIG. 15 shows the sub-modules 11 while omitting some functional components implemented in them as needed, for the sake of simplicity.

The first image processing unit 1902 corresponds to a (static) image processing unit in an attribute value incompatible sub-module 11-5. A pixel value input to this (static) image processing unit corresponds to the input pixel value 1900. A pixel value after the image process by this (static) image processing unit corresponds to the first converted pixel value 1901. The first converted pixel value 1901 is input to an attribute value compatible sub-module 11-2 via the switch matrix 17.

The second image processing unit 1903 corresponds to an (adaptive) image processing unit in the attribute value compatible sub-module 11-2. Note that components such as the information holding unit 1909, weighted average processing unit 1905, and output unit 1908 are implemented in the (adaptive) image processing unit. A pixel value output from this (adaptive) image processing unit corresponds to the output pixel value 1910.

Note that the image processing module 4 including both the attribute value compatible sub-modules and attribute value incompatible sub-module has been exemplified. However, the present invention is not limited to this. For example, even an image processing module 4 including only attribute value compatible sub-modules can implement the aforementioned weighted average process. In this case, one of (adaptive) image processing units in the attribute value compatible sub-modules serves as the first image processing unit 1902. For this reason, the image processing unit which serves as the first image processing unit 1902 is set to skip the weighted average process using the information held in the information holding unit 1909.

Let F(in) be the first image process described using FIG. 13, and G(in) be the second image process. Assume that F(in) and G(in) are respectively one-to-one mapping processes. Let $F^{-1}$(in) be an inverse conversion of the conversion F(in), and H(in, α) be the weighted average process. As shown in FIGS. 14A and 14B, the weighted average process can be expressed by H(in, α)=α(G(in)−F(in)). Then, since the input to the second image processing unit 1903 is F(in), as shown in FIG. 13, H(in, α)=α×(G($F^{-1}$(F(in)))−F(in)) holds. Also, as shown in FIGS. 14A and 14B, the output pixel value is given by [output pixel value=F(in)+H(in, α)]. Therefore, the output pixel value is obtained by the following equation. As described above, since the first converted pixel value 1901 is input to the second image processing unit 1903 in place of the input pixel value 1900, the second image processing unit 1903 generates the output pixel value by calculating:

Output pixel value(in,α)=$F$(in)+α($G$($F^{-1}$($F$(in)))−$F$(in))

(If α=1, second image process=first image process+ weighted average process=G($F^{-1}$(F(in)))=G(in).)

In this case, the attribute value compatible sub-module 11-2 shown in FIG. 15 may execute the weighted average process after an attribute value transfer wrapper layer 110 and the attribute value incompatible sub-module 11-5 shown in FIG. 15 execute the first image process. Conversely, the attribute value compatible sub-module 11-2 shown in FIG. 15 may execute the weighted average process after the attribute value transfer wrapper layer 110 and attribute value incompatible sub-module 11-5 shown in FIG. 15 execute the second image process.

The switch matrix 17 sequentially inputs data to the plurality of sub-modules 11 in a predetermined order, as described above. The data input control by the switch matrix 17 has to consider the processing order according to the contents of the image processes of the respective sub-modules upon execution of the weighted average process. This processing order will be examined below.

A case will be examined first wherein in one of the first and second image processes, image information is lost. For example, when the first image process (in) causes a loss of image information, and the processes are executed in the order of the first image process and the second image process, the following problem is posed.

When F(in1)=F(in2) and G(in1)≠G(in2) hold for specific input values in1 and in2, we have:

Output pixel value(in1,α)=$F$(in1)+α($G$($F^{-1}$($F$(in1)))−$F$(in1))

Output pixel value(in2,α)=$F$(in2)+α($G$($F^{-1}$($F$(in2)))−$F$(in2))

Since F(in1)=F(in2), the two output pixel values become finally equal to each other.

Conversely, when the second image process is executed first, and the weighted average process is then executed, we have:

Output pixel value(in1,α)=$G$(in1)+ α($F$($G^{-1}$($G$(in1)))−$G$(in1))

Output pixel value(in2,α)=$G$(in2)+ α($F$($G^{-1}$($G$(in2)))−$G$(in2))

Since G(in1)≠G(in2), the two output pixel values are finally different from each other.

Naturally, since the output pixel values are to be different from each other, the second image process is preferably executed first. That is, when one of the image processes (first and second image processes) is not a one-to-one mapping process, and causes a loss of image information, the image process free from any loss is preferably executed first.

Next, a case will be examined below wherein neither the first image process nor the second image process is a one-to-one mapping process, and a loss of image information is caused. In this case, an event in which the same output pixel value is obtained when different input pixel values are input occurs more frequently when a process that causes a larger image information loss amount is executed first. Therefore, a process that causes a smaller image information loss amount is preferably executed first.

Note that "a smaller information loss amount" is interpreted as a smaller change. When such interpretation is made, it is configured to execute an image process, which has smaller absolute values (|input pixel value−output pixel value|) of differences between input and output pixel values at all input tones, first. For example, it is configured to execute an image process having a smaller average value or maximum value of the absolute values, first. This process may be executed focusing attention on a specific color (channel), for example, Y of Y, Cb, and Cr, or on all R, G, and B channels.

As a practical example of an image process, a dodging process of a backlight correction will be explained. The dodging process of the backlight correction includes a process for making a dark part as a principal object brighter, and a color conversion process of a background part. In general, a correction amount of the former process (the process for making a dark part as a principal object brighter) is larger than that of the latter process (the color conversion process of a background part). Therefore, in case of the dodging process of the backlight correction, the image processes are preferably executed in the order of the color conversion process of a background part and the process for making a dark part as a principal object brighter.

Likewise, object-dependent processes executed at the time of a copy operation will be exemplified below. The object-dependent processes include, for example, a color conversion process of a document area such as blackening of black characters and whitening of a paper background part, and a process for vividly correcting a photo area. In general, the correction amount of the former process (the color conversion process of a document area) is larger than that of the latter process (the correction process of a photo area). Therefore, in case of the object-dependent processes, the image processes are preferably executed in the order of the correction process of a photo area and the color conversion process of a document area. However, this condition does not always stand, but it depends on originals. For this reason, after an original is analyzed, and correction values are calculated, the order of processes may be determined to assure a smaller information loss amount.

More specifically, an average value A of absolute values-|input pixel value−output pixel value|at all input tones in the first image process is calculated. Then, an average value B of absolute values|input pixel value−output pixel value|at all input tones in the second image process is calculated. If the average value A is equal to or smaller than the average value B, the processes are executed in the order of the first image process and second image process. Conversely, if the average value B is less than the average value A, the processes are executed in the order of the second image process and first image process. In this manner, the image processes, which can suppress a loss of image information, can be realized.

Alternatively, a maximum value may be used in place of the average value of the absolute values at all input tones, or an average value or maximum value may be calculated using an input image or a reduced-scale image of the input image. Furthermore, an output 1 as an ideal processing result obtained by calculating a weighted average of the results of the first and second image processes, an output 2 obtained by executing the weighted average process after the first image process, and an output 3 obtained by executing the weighted average process after the second image process may be used. In this case, which of the outputs 2 and 3 is approximate to the output 1 is calculated, and the processing order is decided based on the calculation result. If the output 2 is more approximate to the output 1, it is preferable that the weighted average process is executed after the first image process. If the output 3 is more approximate to the output 1, it is preferable that the weighted average process is executed after the second image process.

Some types of image processes in the image processing sub-module 11 will be enumerated below. Note that it is preferable for these image processes to execute a process that causes a smaller image information loss amount earlier.

[Local Correction Process of Brightness and Contrast]
A linear lookup table process is suited to this process.
[Local Correction Process of Hue Rotation, Etc.]
A matrix process is suited to this process.

[Local Correction Process of Tincture of, for Example, Skin Color]
A three-dimensional lookup table process is suited to this process.
[Local Edge Emphasis Process or Local Edge Blurring Process]
A filter process is suited to this process.

As described above, according to the eighth embodiment, the weighted average process can be implemented using attribute values without using any dedicated circuit arrangement required to execute the weighted average process. Thus, since the need for arranging a dedicated circuit required to execute the weighted average process can be obviated, for example, a cost reduction can be attained. Also, the weighted average process can be executed to have the same performance as the conventional system.

Note that the case has been exemplified wherein the attribute value a changes within a range from 0 to 1. However, the attribute value range is not limited to this. For example, the attribute value may meet $\alpha<0$ or $\alpha>1$. In this way, a merit of assuring a dynamic range of a value larger or smaller than a table settable value of a linear or three-dimensional lookup table can be provided.

Also, the image processes by the image processing sub-module which executes the first image process shown in FIG. 13 and that which executes the second image process shown in FIG. 13 need not always be successively executed. For example, an image processing sub-module which does not change pixel values as targets of the weighted average process may be arranged between these two sub-modules. The sub-module, which does not pose any problem if it is arranged between the two sub-modules, includes an image processing sub-module which processes only color components which are not targets of the weighted average process, and that which updates only attribute values that are not used in the weighted average process. In addition, such sub-module includes an image processing sub-module which only analyzes pixel values.

The examples of the typical embodiments of the present invention have been described. However, the present invention is not limited to the aforementioned and illustrated embodiments, and can be modified and practiced as needed without departing from the sprit of the invention.

According to the present invention, the weighted average process can be executed using processing image data including pixel values and attribute values associated with the pixel values without arranging any dedicated circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157314 filed on Jul. 1, 2009, which is hereby incorporated by reference herein in its entirety.

What is claimed is:
1. An image processing device, which processes image data in correspondence with one or more pixels of an image, comprising:
a first image processing module configured to operate in accordance with an instruction from a CPU, and
a second image processing module configured to operate in accordance with an instruction from the CPU, wherein the first image processing module comprises:
a first receiving unit configured to receive first processing image data including image data and attribute data; and
a first processing unit configured to process the image data of the received first processing image data based on an attribute value of the attribute data,
wherein the first image processing module
performs processing the image data of the received first processing image data by the first processing unit,
sets a new attribute value of the attribute data to enable a following image processing module incompatible with the attribute data to process the image data including the attribute data, and
outputs second processing image data including the image data and the attribute data of which the new attribute value is set, and
wherein the second image processing module is incompatible with the attribute data, and comprises:
a second processing unit configured to process image data corresponding to the image data of the second processing image data.

2. The device according to claim 1, wherein the received first processing image data correspond to each pixel.

3. The device according to claim 1, wherein the first processing unit executes at least one of a linear lookup table process, three-dimensional lookup table process, filter process, and matrix process.

4. The device according to claim 1, further comprising:
a connection module which connects the first image processing module and the second image processing module, and is configured to move processing image data from one of the first image processing module and the second image processing module to the other of the first image processing module and the second image processing module.

5. The device according to claim 4, further comprising a setting unit configured to set an order of image processes, wherein
the connection module moves the processing image data based on the set order.

6. The device according to claim 5, wherein
the setting unit sets the order of image processes such that an image process causing a smaller image information loss amount is executed earlier.

7. The device according to claim 5, wherein
the setting unit sets the order of image processes such that an image process, which has smaller absolute values of differences between input pixel values and output pixel values at all input tones, is executed first.

8. The device according to claim 1, comprising a plurality of image processing modules including the first image processing module and the second image processing module.

9. The device according to claim 1, further comprising a printing unit configured to print an image.

10. The device according to claim 1, wherein
the first image processing module further comprises a determination unit, configured to determine the attribute data for the first processing unit processing the image data.

11. The device according to claim 10, wherein
the received first processing image data include a plurality of attribute value fields that holds attribute data, each attribute data indicating a processing content different each other, and
the determination unit determines how to use each attribute data.

12. The device according to claim 1, wherein
the image data of the received first processing image data is color image data, and
the attribute data indicates a processing content for a certain color.

13. The device according to claim 1, comprising a plurality of image processing modules including the first image processing module and the second image processing module, and
the device configured to perform a pipeline processing for the image data through the plurality of image processing modules in sequence.

14. The device according to claim 1, wherein
the first image processing module has a function for setting attribute data, in a case where the received first processing image data do not include attribute data.

15. The device according to claim 1, wherein,
the first image processing module sets 0 to the attribute data as the attribute value or removes the attribute data for the following image processing module.

16. The device according to claim 1, wherein
a certain number of bits are assigned for the attribute data and the image data of the received first processing image data.

17. The device according to claim 16, wherein
number of bits assigned for the image data and the attribute data of the second processing image data is as same as the certain number.

18. The device according to claim 16, wherein
the first image processing module further comprises a changing unit, configured to change a ratio of the image data and the attribute data of the second processing image data.

19. The device according to claim 1, wherein
the received first processing image data include a plurality of pixel value field that holds image data and a plurality of attribute value fields that holds attribute data.

20. The device according to claim 1, wherein
each of the first image processing module and the second image processing module includes a resistor, and
the CPU controls each of the first image processing module and the second image processing module by setting a parameter in the resistor.

21. The device according to claim 1, wherein
the first image processing module newly sets the attribute data, by updating at least one attribute value of the attribute data included in the received first processing image data.

22. The device according to claim 1,
wherein the second image processing module handles the attribute value as pixel value for indicating color of the image and the first image processing module sets 0 to the attribute data as the attribute data.

23. An image processing method for processing image data in correspondence with one or more pixels of an image using an image processing device,
the device comprising a first image processing module configured to operate in accordance with an instruction from a CPU and a second image processing module configured to operate in accordance with an instruction from the CPU,
the method, comprising:
receiving, in the first image processing module, first processing image data including image data and attribute data, wherein the first image processing module is compatible with the attribute data and the second image processing module is incompatible with the attribute data;

processing, in the first image processing module, the image data of the received first processing image data, as a first processing, based on an attribute value of the attribute data;

setting a new attribute value of the attribute data, in the first image processing module, to enable to a following image processing module incompatible with the attribute data to process the image data including the attribute data;

outputting, from the first image processing module, second processing image data including the image data and the attribute data of which the new attribute value is set; and processing, in the second image processing module, image data corresponding to the image data of the second processing image data.

24. The method according to claim 23, wherein
the received first processing image data include a plurality of attribute value fields that holds attribute data, each attribute data indicating a processing content different each other, and
the method further comprises determining, in the first image processing module, how to use each attribute data for processing the image data.

25. The method according to claim 23, wherein
a certain number of bits are assigned for the attribute data and the image data of the received first processing image data,
the method further comprises changing, in the first image processing module, a ratio of the image data and the attribute data of the second processing image data.

26. The method according to claim 23, wherein
the received first processing image data include a plurality of pixel value field that holds image data and a plurality of attribute value fields that holds attribute data.

27. The method according to claim 23, wherein
the newly setting the attribute data is performed by updating at least one attribute value of the attribute data included in the received first processing image data.

28. The method according to claim 23,
wherein the second image processing module handles the attribute value as pixel value for indicating color of the image and in the first image processing module, setting 0 to the attribute data as the attribute data.

* * * * *